US009754037B2

(12) United States Patent
Ayan et al.

(10) Patent No.: US 9,754,037 B2
(45) Date of Patent: Sep. 5, 2017

(54) BLENDING BY QUERY CLASSIFICATION ON ONLINE SOCIAL NETWORKS

(71) Applicant: Facebook, Inc., Menlo Park, CA (US)

(72) Inventors: Necip Fazil Ayan, Palo Alto, CA (US); Maxime Boucher, Mountain View, CA (US); Xiao Li, Sunnyvale, CA (US); Alexander Perelygin, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 224 days.

(21) Appl. No.: 14/470,583

(22) Filed: Aug. 27, 2014

(65) Prior Publication Data

US 2016/0063115 A1 Mar. 3, 2016

(51) Int. Cl.
*G06F 17/30* (2006.01)
*G06Q 50/00* (2012.01)

(52) U.S. Cl.
CPC ....... *G06F 17/30867* (2013.01); *G06Q 50/01* (2013.01)

(58) Field of Classification Search
CPC ......... G06F 17/30861; G06F 17/30867; G06C 50/01
USPC ................................ 707/722, 758, 769, 771
See application file for complete search history.

(56) References Cited

U.S. PATENT DOCUMENTS

| | | | |
|---|---|---|---|
| 6,539,232 B2 | 3/2003 | Hendrey | |
| 6,957,184 B2 | 10/2005 | Schmid | |
| 7,069,308 B2 | 6/2006 | Abrams | |
| 7,539,697 B1 | 5/2009 | Akella | |
| 7,752,326 B2 | 7/2010 | Smit | |
| 7,836,044 B2 | 11/2010 | Kamvar | |
| 8,027,990 B1 | 9/2011 | Mysen | |
| 8,060,639 B2 | 11/2011 | Smit | |
| 8,112,529 B2 | 2/2012 | Van Den Oord | |
| 8,180,804 B1 | 5/2012 | Narayanan | |
| 8,185,558 B1 | 5/2012 | Narayanan | |
| 8,239,364 B2 | 8/2012 | Wable | |
| 8,244,848 B1 | 8/2012 | Narayanan | |
| 8,271,471 B1 | 9/2012 | Kamvar | |
| 8,271,546 B2 | 9/2012 | Gibbs | |
| 8,301,639 B1 | 10/2012 | Myllymaki | |
| 8,321,364 B1 | 11/2012 | Gharpure | |
| 8,364,709 B1 | 1/2013 | Das | |
| 8,386,465 B2 | 2/2013 | Ansari | |
| 8,407,200 B2 | 3/2013 | Wable | |
| 8,412,749 B2 | 4/2013 | Fortuna | |

(Continued)

OTHER PUBLICATIONS

U.S. Appl. No. 14/470,607, filed Aug. 27, 2014, Boucher.

*Primary Examiner* — Hares Jami
(74) *Attorney, Agent, or Firm* — Baker Botts L.L.P.

(57) ABSTRACT

In one embodiment, a method includes receiving a search query from a first user and identifying one or more second nodes that match the search query. The method includes determining one or more search intents of the search query. Search intent may be based on one or more topics associated with the identified nodes and one or more node-types of the identified nodes. The method includes generating one or more search results corresponding to the search query, the search-results being generated based on the determined search intents. The method includes sending a search-results page to the client system of the first user for display. The search-results page may include one or more of the generated search results.

19 Claims, 12 Drawing Sheets

(56) References Cited

U.S. PATENT DOCUMENTS

| | | |
|---|---|---|
| 8,538,960 B2 | 9/2013 | Wong |
| 8,572,129 B1 | 10/2013 | Lee |
| 8,595,297 B2 | 11/2013 | Marcucci |
| 8,601,027 B2 | 12/2013 | Behforooz |
| 8,732,208 B2 | 5/2014 | Lee |
| 8,751,521 B2 | 6/2014 | Lee |
| 8,782,080 B2 | 7/2014 | Lee |
| 9,633,082 B2 * | 4/2017 | Li .................. G06F 17/3053 |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0255237 A1 | 12/2004 | Tong |
| 2005/0131872 A1 | 6/2005 | Calbucci |
| 2005/0171955 A1 | 8/2005 | Hull |
| 2006/0116994 A1 * | 6/2006 | Jonker .............. G06F 17/30017 |
| 2006/0136419 A1 | 6/2006 | Brydon |
| 2007/0277100 A1 | 11/2007 | Sheha |
| 2008/0072180 A1 | 3/2008 | Chevalier |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0281988 A1 | 11/2009 | Yoo |
| 2009/0299963 A1 | 12/2009 | Pippori |
| 2010/0049802 A1 | 2/2010 | Raman |
| 2010/0228744 A1 | 9/2010 | Craswell |
| 2010/0235354 A1 | 9/2010 | Gargaro |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0191371 A1 | 8/2011 | Elliott |
| 2011/0196855 A1 | 8/2011 | Wable |
| 2011/0276396 A1 | 11/2011 | Rathod |
| 2011/0313992 A1 | 12/2011 | Groeneveld |
| 2012/0059708 A1 | 3/2012 | Galas |
| 2012/0059713 A1 * | 3/2012 | Galas .................. G06Q 30/0244 705/14.49 |
| 2012/0136852 A1 | 5/2012 | Geller |
| 2012/0166432 A1 | 6/2012 | Tseng |
| 2012/0179637 A1 | 7/2012 | Juan |
| 2012/0185486 A1 | 7/2012 | Voigt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290566 A1 * | 11/2012 | Dasher .............. G06F 17/30244 707/723 |
| 2012/0311034 A1 | 12/2012 | Goldband |
| 2012/0323991 A1 * | 12/2012 | Wang .................. H04L 51/32 709/203 |
| 2012/0331063 A1 * | 12/2012 | Rajaram .............. G06Q 50/01 709/206 |
| 2013/0031106 A1 | 1/2013 | Schechter |
| 2013/0041876 A1 | 2/2013 | Dow |
| 2013/0066876 A1 | 3/2013 | Raskino |
| 2013/0086057 A1 | 4/2013 | Harrington |
| 2013/0124538 A1 | 5/2013 | Lee |
| 2013/0124542 A1 * | 5/2013 | Lee .................. G06F 17/30392 707/751 |
| 2013/0144899 A1 * | 6/2013 | Lee .................. G06F 17/30392 707/759 |
| 2013/0166543 A1 * | 6/2013 | MacDonald ...... G06F 17/30867 707/723 |
| 2013/0191372 A1 | 7/2013 | Lee |
| 2013/0191416 A1 | 7/2013 | Lee |
| 2013/0226918 A1 | 8/2013 | Berkhim |
| 2013/0246404 A1 | 9/2013 | Annau |
| 2015/0317314 A1 * | 11/2015 | Venkataraman .... G06F 17/3053 707/750 |

* cited by examiner

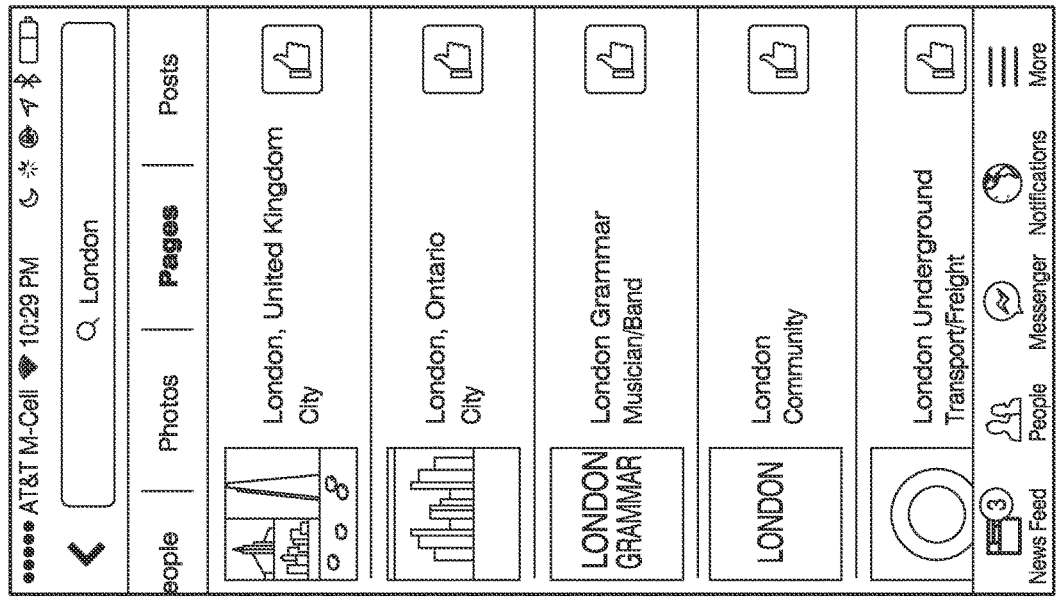

BLENDING BY QUERY CLASSIFICATION ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a social-networking system may generate structured queries that include references to particular social-graph elements. These structured queries may be generated, for example, in response to a text query provided by a user, or generated as default queries. By providing suggested structured queries to a user's text query, the social-networking system may provide a powerful way for users of an online social network to search for elements represented in a social graph based on their social-graph attributes and their relation to various social-graph elements.

In particular embodiments, the social-networking system may provide customized keyword completion suggestions in a non-structured format. The social networking system may provide high-quality keyword suggestions in response to a user inputting a text string into a query field. In some embodiments, the social network may access multiple sources within the social network, score the suggestions from these sources, and then return blended results to the user. Suggested keywords may come from a variety of sources, for example, the current query log, list of social-network entities, entity metadata, and grammars from the grammar model parser. The social-networking system may combine the suggestions from each source, and present suggested queries to the user. The multi-source functionality may enable better signal for suggestions to make because it is based on the data existing in the user's network.

In an exemplary embodiment, a method may include accessing a social graph. The social graph may include a plurality of nodes and a plurality of edges connecting the nodes. Each of the edges between two of the nodes may represent a single degree of separation between them. The nodes may include a first node corresponding to a first user associated with an online social network and a plurality of second nodes that each correspond to a concept or a second user associated with the online social network. The method may include receiving from a client system of a first user an unstructured text query. The text query may be parsed to identify one or more n-grams, wherein at least one of the n-grams is an ambiguous n-gram. The method may include searching a plurality of keyword generators to identify one or more keyword suggestions matching the ambiguous n-gram, each identified keyword suggestion corresponding to one or more second nodes of the plurality of second nodes. A keyword score for each identified keyword suggestion may be calculated. One or more suggestion queries may be generated. Each suggested query may include one or more n-grams identified from the text query and one or more identified keyword suggestions having a keyword score greater than a threshold keyword score. The method may include sending, responsive to receiving the unstructured text query, one or more of the suggested queries to the client system of the first user for display, the suggested queries being displayed in ranked order based on the keyword scores for the identified keyword suggestions including each suggested query.

In particular embodiments, the social-networking system may provide customized search experiences based on the intent of the search query. The social network may determine the intent of a search query based on entity and topic matching, and then blend the generated search results in a customized manner based on the determined intent. As an example and not by way of limitation, if the user is performing a people search as opposed to a celebrity search or a pages search, the user experience may be improved by determining the intent of the query in order to determine what will be displayed to the querying user. The query intents may include people (including friends, friends-of-friend, and exploratory), celebrity, place, page, and keyword/topic. Although this functionality may be used in the typeahead and structured query contexts, it may also be used for unstructured keyword searches. The query intent may be determined in a variety of ways. In some embodiments, the intent may be determined by combining a keyword search and an entity search. In some embodiments, the intent may be determined based on the results from a topic tagger. For example, if lots of users are identified, this it is likely a people search; if lots of posts are pulled, then it is likely a topic search. The information may be combined by scoring and ranking the information. If the social-networking system determines that there is a match between the results from the topic tagger and the entity search, then those matches provide strong signals that define the intent of the query as being a topic query for that particular topic. However, if the social-networking system determine there is no topic match, then distribution may be used along the entity results in combination with text estimation. Text estimation is a language-model based text estimation of the classification for the query based on named entities within the social graph and not necessarily based on the query the user enters. The social-networking system may use text estimation and the actual entity search results to determine query intent. In some embodiments, search results which the user is more likely to click, based on the intent of the search query, may be provided to the user for display.

In an exemplary embodiment, a method may include accessing a social graph. The social graph may include a plurality of nodes and a plurality of edges connecting the nodes. Each of the edges between two of the nodes may represent a single degree of separation between them. The nodes may include a first node corresponding to a first user associated with an online social network and a plurality of second nodes that each correspond to a concept or a second user associated with the online social network. The method may include receiving from a client system of the first user a search query. The method may include identifying one or more second nodes that match the search query. The method may include generating one or more search results corresponding to the search query. The search results may be generated based on the determined search intents of the search query. Each search result may include a reference to one of the identified second nodes. The method may include sending a search-results page to the client system of the first user for display. The search-results page may be sent responsive to receiving the search query. The search-results page may include one or more of the generated search results.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, may be claimed in another claim category, e.g. system, as well. The dependencies or references back in the attached claims are chosen for formal reasons only. However any subject matter resulting from a deliberate reference back to any previous claims (in particular multiple dependencies) may be claimed as well, so that any combination of claims and the features thereof are disclosed and may be claimed regardless of the dependencies chosen in the attached claims. The subject-matter which may be claimed comprises not only the combinations of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

BRIEF DESCRIPTION OF THE DRAWINGS

FIGS. 7A-7D illustrate example search-results pages of the social network.

FIGS. 8A-8D illustrate additional example search-results pages of the social network.

DESCRIPTION OF EXAMPLE EMBODIMENTS

System Overview

Figure 1:
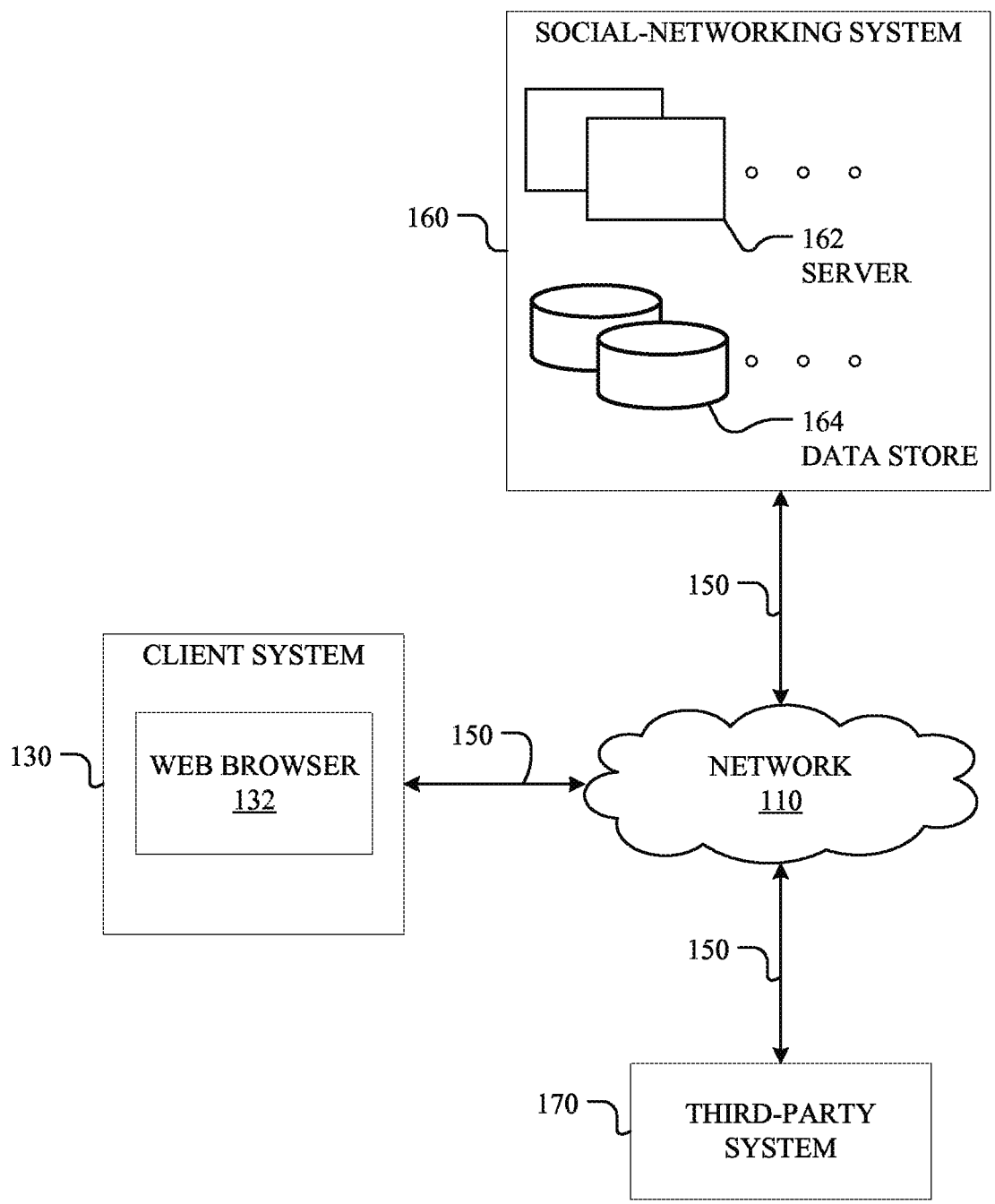
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
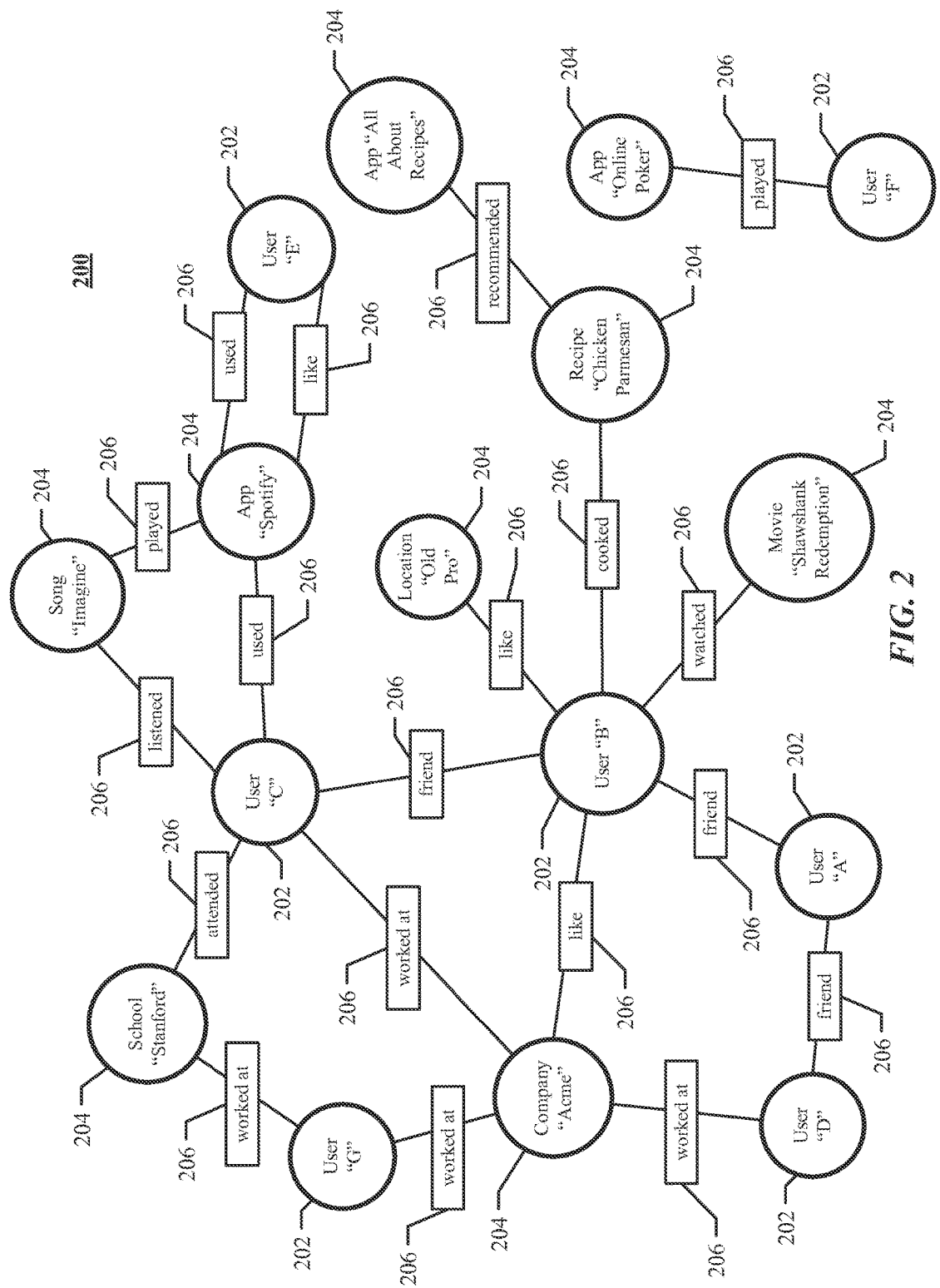
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Typeahead Processes

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, a user interface of a native application associated with the online social network, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element.

In particular embodiments, as a user types or otherwise enters text into a form used to add content or make declarations in various sections of the user's profile page, home page, or other page, the typeahead process may work in conjunction with one or more frontend (client-side) and/or backend (server-side) typeahead processes (hereinafter referred to simply as "typeahead process") executing at (or within) the social-networking system 160 (e.g., within servers 162), to interactively and virtually instantaneously (as appearing to the user) attempt to auto-populate the form with a term or terms corresponding to names of existing social-graph elements, or terms associated with existing social-graph elements, determined to be the most relevant or best match to the characters of text entered by the user as the user enters the characters of text. Utilizing the social-graph information in a social-graph database or information extracted and indexed from the social-graph database, including information associated with nodes and edges, the typeahead processes, in conjunction with the information from the social-graph database, as well as potentially in conjunction with various others processes, applications, or databases located within or executing within social-networking system 160, may be able to predict a user's intended declaration with a high degree of precision. However, the social-networking system 160 can also provides user's with the freedom to enter essentially any declaration they wish, enabling users to express themselves freely.

In particular embodiments, as a user enters text characters into a form box or other field, the typeahead processes may attempt to identify existing social-graph elements (e.g., user nodes 202, concept nodes 204, or edges 206) that match the string of characters entered in the user's declaration as the user is entering the characters. In particular embodiments, as the user enters characters into a form box, the typeahead process may read the string of entered textual characters. As each keystroke is made, the frontend-typeahead process may send the entered character string as a request (or call) to the backend-typeahead process executing within social-networking system 160. In particular embodiments, the typeahead processes may communicate via AJAX (Asynchronous JavaScript and XML) or other suitable techniques, and particularly, asynchronous techniques. In particular embodiments, the request may be, or comprise, an XMLHTTPRequest (XHR) enabling quick and dynamic sending and fetching of results. In particular embodiments, the typeahead process may also send before, after, or with the request a section identifier (section ID) that identifies the particular section of the particular page in which the user is making the declaration. In particular embodiments, a user ID parameter may also be sent, but this may be unnecessary in some embodiments, as the user may already be "known" based on the user having logged into (or otherwise been authenticated by) the social-networking system 160.

In particular embodiments, the typeahead process may use one or more matching algorithms to attempt to identify matching social-graph elements. In particular embodiments, when a match or matches are found, the typeahead process may send a response (which may utilize AJAX or other suitable techniques) to the user's client system 130 that may include, for example, the names (name strings) or descriptions of the matching social-graph elements as well as, potentially, other metadata associated with the matching social-graph elements. As an example and not by way of limitation, if a user entering the characters "pok" into a query field, the typeahead process may display a drop-down menu that displays names of matching existing profile pages and respective user nodes 202 or concept nodes 204, such as a profile page named or devoted to "poker" or "pokemon", which the user can then click on or otherwise select thereby confirming the desire to declare the matched user or concept name corresponding to the selected node. As another example and not by way of limitation, upon clicking "poker," the typeahead process may auto-populate, or causes the web browser 132 to auto-populate, the query field with the declaration "poker". In particular embodiments, the typeahead process may simply auto-populate the field with the name or other identifier of the top-ranked match rather than display a drop-down menu. The user may then confirm the auto-populated declaration simply by keying "enter" on his or her keyboard or by clicking on the auto-populated declaration.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

Structured Search Queries

Figure 3:
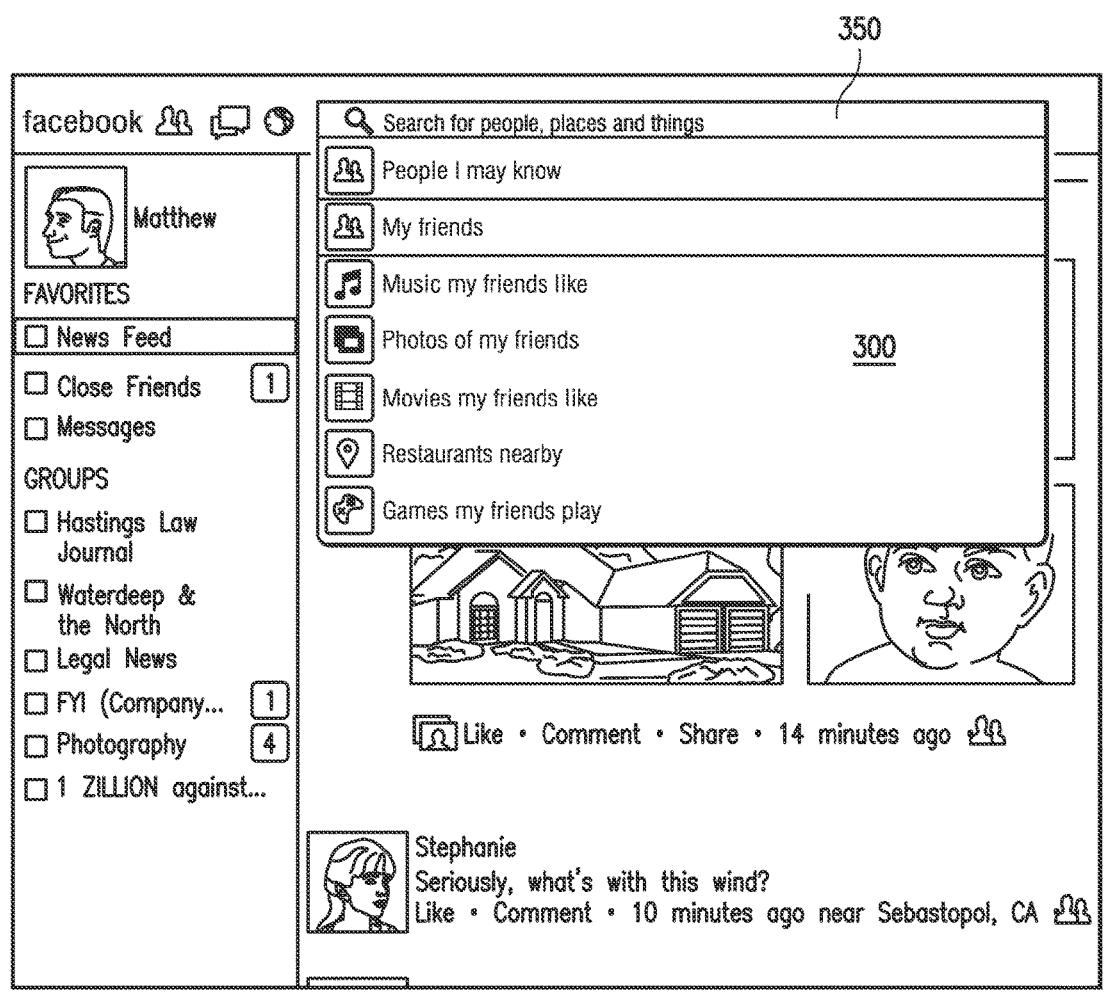
FIG. 3 illustrates an example page of an online social network.

FIG. 3 illustrates an example page of an online social network. In particular embodiments, a user may submit a query to the social-networking system 160 by inputting text into query field 350. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into query field 350 to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

In particular embodiments, the typeahead processes described herein may be applied to search queries entered by a user. As an example and not by way of limitation, as a user enters text characters into a query field 350, a typeahead process may attempt to identify one or more user nodes 202, concept nodes 204, or edges 206 that match the string of characters entered into query field 350 as the user is entering the characters. As the typeahead process receives requests or calls including a string or n-gram from the text query, the typeahead process may perform or causes to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu 300 that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu 300. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503, 093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Element Detection and Parsing Ambiguous Terms

Figure 4A:
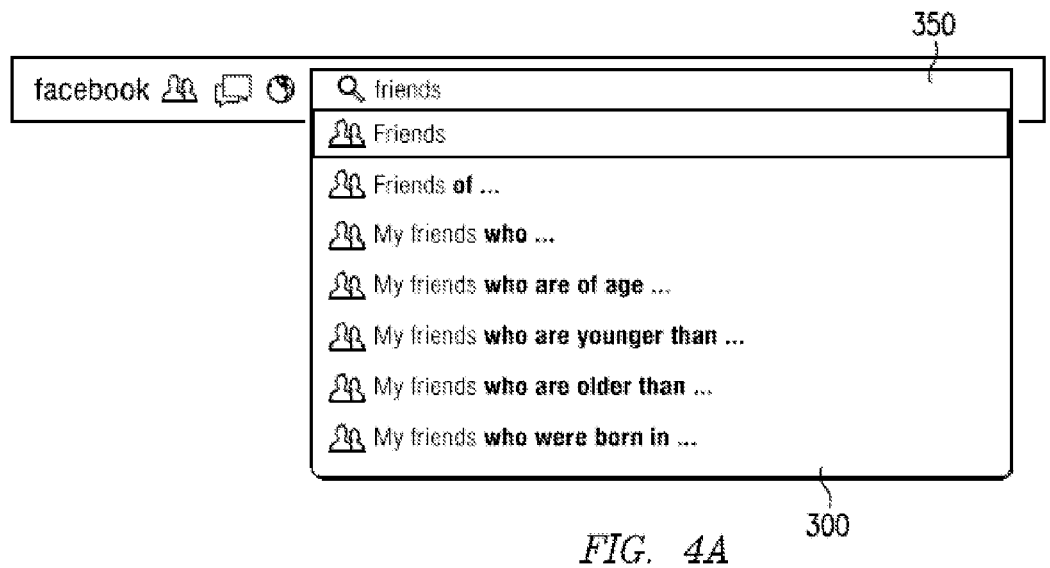
FIGS. 4A-4B illustrate example queries of the social network.
Figure 4B:
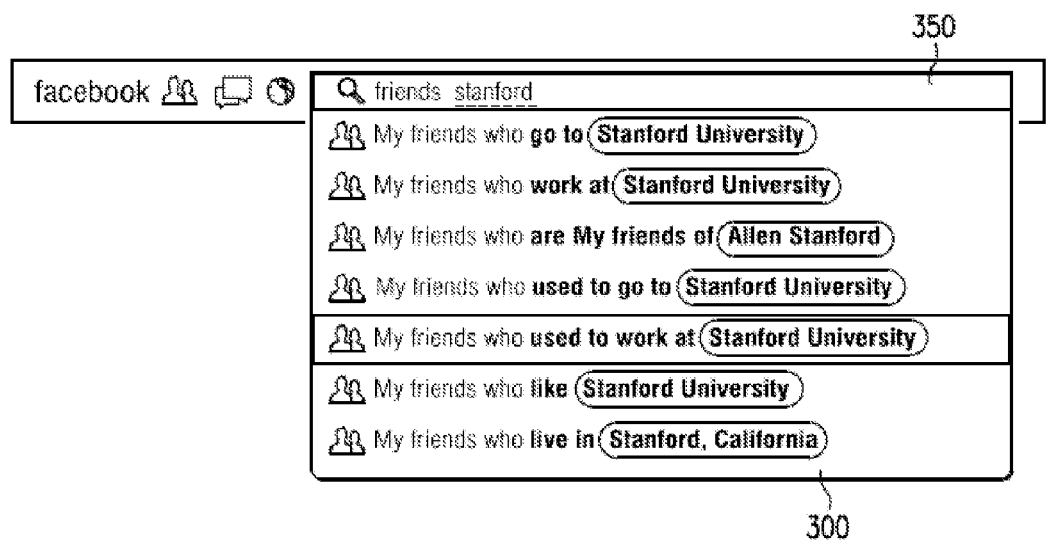

FIGS. 4A-4B illustrate example queries of the social network. In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. These structured queries may be presented to the querying user, who can then select among the structured queries to indicate which social-graph element the querying user intended to reference with the ambiguous term. In response to the querying user's selection, the social-networking system 160 may then lock the ambiguous term in the query to the social-graph element selected by the querying user, and then generate a new set of structured queries based on the selected social-graph element. FIGS. 4A-4B illustrate various example text queries in query field 350 and various structured queries generated in response in drop-down menus 300 (although other suitable graphical user interfaces are possible). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu 300 (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes and FIGS. 4A-4B illustrate generating particular structured queries in a particular manner, this disclosure contemplates generating any suitable structured queries in any suitable manner.

In particular embodiments, the social-networking system 160 may receive from a querying/first user (corresponding to a first user node 202) an unstructured text query. As an example and not by way of limitation, a first user may want to search for other users who: (1) are first-degree friends of the first user; and (2) are associated with Stanford University (i.e., the user nodes 202 are connected by an edge 206 to the concept node 204 corresponding to the school "Stanford"). The first user may then enter a text query "friends stanford" into query field 350, as illustrated in FIGS. 4A-4B. As the querying user enters this text query into query field 350, the social-networking system 160 may provide various suggested structured queries, as illustrated in drop-down menus 300. As used herein, an unstructured text query refers to a simple text string inputted by a user. The text query may, of course, be structured with respect to standard language/grammar rules (e.g. English language grammar). However, the text query will ordinarily be unstructured with respect to social-graph elements. In other words, a simple text query will not ordinarily include embedded references to particular social-graph elements. Thus, as used herein, a structured query refers to a query that contains references to particular social-graph elements, allowing the search engine to search based on the identified elements. Furthermore, the text query may be unstructured with respect to formal query syntax. In other words, a simple text query will not necessarily be in the format of a query command that is directly executable by a search engine (e.g., the text query "friends stanford" could be parsed to form the query command "intersect(school (Stanford University), friends(me)", or "/search/me/friends/ [node ID for Stanford University]/students/ever-past/intersect", which could be executed as a query in a social-graph database). Although this disclosure describes receiving particular queries in a particular manner, this disclosure contemplates receiving any suitable queries in any suitable manner.

In particular embodiments, social-networking system 160 may parse the unstructured text query (also simply referred to as a search query) received from the first user (i.e., the querying user) to identify one or more n-grams. In general, an n-gram is a contiguous sequence of n items from a given sequence of text or speech. The items may be characters, phonemes, syllables, letters, words, base pairs, prefixes, or other identifiable items from the sequence of text or speech. The n-gram may comprise one or more characters of text (letters, numbers, punctuation, etc.) entered by the querying user. An n-gram of size one can be referred to as a "unigram," of size two can be referred to as a "bigram" or "digram," of size three can be referred to as a "trigram," and so on. Each n-gram may include one or more parts from the text query received from the querying user. In particular embodiments, each n-gram may comprise a character string (e.g., one or more characters of text) entered by the first user. As an example and not by way of limitation, the social-networking system 160 may parse the text query "friends stanford" to identify the following n-grams: friends; stanford; friends stanford. As another example and not by way of limitation, the social-networking system 160 may parse the text query "friends in palo alto" to identify the following n-grams: friends; in; palo; alto; friends in; in palo; palo alto; friend in palo; in palo alto; friends in palo alto. In particular embodiments, each n-gram may comprise a contiguous sequence of n items from the text query. Although this disclosure describes parsing particular queries in a particular manner, this disclosure contemplates parsing any suitable queries in any suitable manner.

In particular embodiments, social-networking system 160 may identify a plurality of nodes or a plurality of edges corresponding to one or more of the n-grams of a text query. Identifying social-graph elements that correspond to an n-gram may be done in a variety of manners, such as, for example, by determining or calculating, for each n-gram identified in the text query, a score that the n-gram corresponds to a social-graph element. The score may be, for example, a confidence score, a probability, a quality, a ranking, another suitable type of score, or any combination thereof. As an example and not by way of limitation, the social-networking system 160 may determine a probability score (also referred to simply as a "probability") that the n-gram corresponds to a social-graph element, such as a user node 202, a concept node 204, or an edge 206 of social graph 200. The probability score may indicate the level of similarity or relevance between the n-gram and a particular social-graph element. There may be many different ways to calculate the probability. The present disclosure contemplates any suitable method to calculate a probability score for an n-gram identified in a search query. In particular embodiments, the social-networking system 160 may determine a probability, p, that an n-gram corresponds to a particular social-graph element. The probability, p, may be calculated as the probability of corresponding to a particular social-graph element, k, given a particular search query, X. In other words, the probability may be calculated as p=(k|X). As an example and not by way of limitation, a probability that an n-gram corresponds to a social-graph element may calculated as an probability score denoted as $p_{i,j,k}$. The input may be a text query $X=(x_1, x_2, \ldots, x_N)$, and a set of classes. For each (i:j) and a class k, the social-networking system 160 may compute $p_{i,j,k}=p(\text{class}(x_{i:j})=k|X)$. As an example and not by way of limitation, the n-gram "stanford" could be scored with respect to the following social-graph elements as follows: school "Stanford University"=0.7; location "Stanford, Calif."=0.2; user "Allen Stanford"=0.1. In this example, because the n-gram "stanford" corresponds to multiple social-graph elements, it may be considered an ambiguous n-gram by the social-networking system 160. In other words, the n-gram is not immediately resolvable to a single social-graph element based on the parsing algorithm used by the social-networking system 160. In particular embodiments, after identifying an ambiguous n-gram, the social-networking system 160 may highlight that n-gram in the text query to indicate that it may correspond to multiple social-graph elements. As an example and not by way of limitation, as illustrated in FIG. 4B the term "Stanford" in query field 350 has been highlighted with a dashed-underline to indicate that it may correspond to multiple social-graph elements, as discussed previously. Although this disclosure describes determining whether n-grams correspond to social-graph elements in a particular manner, this disclosure contemplates determining whether n-grams correspond to social-graph elements in any suitable manner. Moreover, although this disclosure describes determining whether an n-gram corresponds to a social-graph element using a particular type of score, this disclosure contemplates determining whether an n-gram corresponds to a social-graph element using any suitable type of score.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference.

Generating Structured Search Queries

In particular embodiments, the social-networking system 160 may access a context-free grammar model comprising a plurality of grammars. Each grammar of the grammar model may comprise one or more non-terminal tokens (or "non-terminal symbols") and one or more terminal tokens (or "terminal symbols"/"query tokens"), where particular non-terminal tokens may be replaced by terminal tokens. A grammar model is a set of formation rules for strings in a formal language. Although this disclosure describes accessing particular grammars, this disclosure contemplates any suitable grammars.

In particular embodiments, the social-networking system 160 may generate one or more strings using one or more grammars. To generate a string in the language, one begins with a string consisting of only a single start symbol. The production rules are then applied in any order, until a string that contains neither the start symbol nor designated non-terminal symbols is produced. In a context-free grammar, the production of each non-terminal symbol of the grammar is independent of what is produced by other non-terminal symbols of the grammar. The non-terminal symbols may be replaced with terminal symbols (i.e., terminal tokens or query tokens). Some of the query tokens may correspond to identified nodes or identified edges, as described previously. A string generated by the grammar may then be used as the basis for a structured query containing references to the identified nodes or identified edges. The string generated by the grammar may be rendered in a natural-language syntax, such that a structured query based on the string is also rendered in natural language. A context-free grammar is a grammar in which the left-hand side of each production rule consists of only a single non-terminal symbol. A probabilistic context-free grammar is a tuple ($\Sigma$, N, S, P), where the disjoint sets $\Sigma$ and N specify the terminal and non-terminal symbols, respectively, with S∈N being the start symbol. P is the set of productions, which take the form E→ξ(p), with E∈N, ξ∈($\Sigma \cup N$)$^+$, and p=Pr(E→ξ), the probability that E will be expanded into the string ξ. The sum of probabilities p over all expansions of a given non-terminal E must be one. Although this disclosure describes generating strings in a particular manner, this disclosure contemplates generating strings in any suitable manner.

In particular embodiments, the social-networking system 160 may generate one or more structured queries. The structured queries may be based on the natural-language strings generated by one or more grammars, as described previously. Each structured query may include references to one or more of the identified nodes or one or more of the identified edges 206. This type of structured query may allow the social-networking system 160 to more efficiently search for resources and content related to the online social network (such as, for example, profile pages) by searching for content connected to or otherwise related to the identified user nodes 202 and the identified edges 206. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). These structured queries may be pre-generated and accessed from a cache or generated dynamically in response to input from the user. Although this disclosure describes generating particular structured queries in a particular manner, this disclosure contemplates generating any suitable structured queries in any suitable manner.

In particular embodiments, social-networking system 160 may score the generated structured queries. The score may be, for example, a confidence score, a probability, a quality, a ranking, another suitable type of score, or any combination thereof. The structured queries may be scored based on a variety of factors, such as, for example, the page or type of page the user is accessing, user-engagement factors, business-intelligence data, the click-thru rate of particular queries, the conversion-rate of particular queries, user-preferences of the querying user, the search history of the user, advertising sponsorship of particular queries, the querying user's social-graph affinity for social-graph elements referenced in particular queries, the intent of the user, the general or current popularity of particular queries, the usefulness of particular queries, the geographic location of the user, other suitable factors, or any combination thereof. Although this disclosure describes ranking structured queries in a particular manner, this disclosure contemplates ranking structured queries in any suitable manner.

In particular embodiments, social-networking system 160 may send one or more of the structured queries to the querying user. As an example and not by way of limitation, after the structured queries are generated, the social-networking system 160 may send one or more of the structured queries as a response (which may utilize AJAX or other suitable techniques) to the user's client system 130 that may include, for example, the names (name strings) of the referenced social-graph elements, other query limitations (e.g., Boolean operators, etc.), as well as, potentially, other metadata associated with the referenced social-graph elements. The web browser 132 on the querying user's client system 130 may display the sent structured queries in a drop-down menu 300, as illustrated in FIGS. 4A-4B. In particular embodiments, the sent queries may be presented to the querying user in a ranked order, such as, for example, based on a rank previously determined as described above. Structured queries with better rankings may be presented in a more prominent position. Furthermore, in particular embodiments, only structured queries above a threshold rank may be sent or displayed to the querying user. As an example and not by way of limitation, as illustrated in FIGS. 4A-4B, the structured queries may be presented to the querying user in a drop-down menu 300 where higher ranked structured queries may be presented at the top of the menu, with lower ranked structured queries presented in descending order down the menu. In the examples illustrated in FIGS. 4A-4B, only the seven highest ranked queries are sent and displayed to the user. In particular embodiments, one or more references in a structured query may be highlighted (e.g., outlined, underlined, circled, bolded, italicized, colored, lighted, offset, in caps) in order to indicate its correspondence to a particular social-graph element. As an example and not by way of limitation, as illustrated in FIG. 4B, the references to "Stanford University" and "Stanford, Calif." are highlighted (outlined) in the structured queries to indicate that it corresponds to a particular concept node 204. Similarly, the references to "Friends", "like", "work at", and "go to" in the structured queries presented in drop-down menu 300 could also be highlighted to indicate that they correspond to particular edges 206. Although this disclosure describes sending particular structured queries in a particular manner, this disclosure contemplates sending any suitable structured queries in any suitable manner.

In particular embodiments, social-networking system 160 may receive from the querying user a selection of one of the structured queries. The nodes and edges referenced in the received structured query may be referred to as the selected nodes and selected edges, respectively. As an example and not by way of limitation, the web browser 132 on the querying user's client system 130 may display the sent structured queries in a drop-down menu 300, as illustrated in FIGS. 4A-4B, which the user may then click on or otherwise select (e.g., by touching the query on a touchscreen or keying "enter" on his keyboard) to indicate the particular structured query the user wants the social-networking system 160 to execute. Although this disclosure describes receiving selections of particular structured queries in a particular manner, this disclosure contemplates receiving selections of any suitable structured queries in any suitable manner.

More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, social-networking system 160 may provide customized keyword completion suggestions (herein referred to simply as "keyword suggestions") to a querying user as the user is inputting a text string into a query field. Keyword suggestions may be provided to the user in a non-structured format. In order to generate a keyword suggestion, the social-networking system 160 may access multiple sources within the social-networking system 160 to generate keyword suggestions, score the suggestions from the multiple sources, and then return the keyword suggestions to the user. As an example and not by way of limitation, and as described further below, if a user types the query "friends stan," then the social-networking system 160 may suggest, for example, "friends stanford," friends stanford university," friends stanley," "friends stanley cooper," "friends stanley kubrick," "friends stanley cup," and "friends stanlonski." In this example, the social-networking system 160 is suggesting the keywords which are modifications of the ambiguous n-gram "stan", where the suggestions may be generated from a variety of keyword generators. The social-networking system 160 may have selected the keyword suggestions because the user is connected in some way to the suggestions. As an example and not by way of limitation, the querying user may be connected within social graph 200 to the concept node 204 corresponding to Stanford University, for example by like- or attended-type edges 206. The querying user may also have a friend named Stanley Cooper. The querying user may have greater than one degree of separation from the social-graph entity associated with the suggested keyword(s). As an example and not by way of limitation, the querying user may have friends that have a "like" connection to the director Stanley Kubrick (i.e., the friends correspond to user nodes 202 connected by a like-type edge 206 to the concept node 204 corresponding to deceased director Stanley Kubrick). As another example and not by way of limitation, the querying user may have friends that have posted about the "Stanley Cup" (i.e., the friends correspond to user nodes 202 connected by posted-type edges to concept nodes 204 corresponding to posts that include content about the Stanley Cup, or include tags to the Stanly Cup). As yet another example and not by way of limitation, the querying user may have a friend who is friends with a person named Stanlonski (i.e., Stanlonski is a second-degree connection of the querying user). As another example and not by way of limitation, if a user types "lady," the social-networking system 160 may suggest "lady gaga," and "lady bug." In the example, the social-networking system 160 is suggesting the keywords which are modifications of the ambiguous n-gram "lady." The keyword suggestions "lady gaga" and "lady bug" may have been generated by the typeahead function described above. Although this disclosure describes generating keyword suggestions in a particular manner, this disclosure contemplates generating keyword suggestions in any suitable manner.

In particular embodiments, social-networking system 160 may search a plurality of keyword generators to identify one or more keyword suggestions matching the ambiguous n-gram. As discussed previously, social-networking system 160 may receive from a client system 130 of a first/querying user an unstructured text query. As an example and not by way of limitation, social-networking system 160 may receive from a client system 130 an unstructured text query such as "friends stan," or "lady." Furthermore, as discussed previously, social-networking system 160 may parse the text query to identify one or more n-grams, wherein at least one of the n-grams is an ambiguous n-gram. As noted above, if an n-gram is not immediately resolvable to a single social-graph element based on the parsing algorithm used by the social-networking system 160, it may be an ambiguous n-gram. The parsing may be performed as described in detail hereinabove. As an example and not by way of limitation, social-networking system 160 may receive the text query "friend stan." The text query may be parsed into the n-grams "friend" and the ambiguous n-gram "stan." "stan" is an ambiguous n-gram because it does not match a specific element of social graph 200. By contrast, "friends" refers to a specific type of edge 206, "friend" and therefore may not be considered ambiguous. Social-networking system 160 may then search a plurality of keyword generators to identify one or more keyword suggestions to match the ambiguous n-gram "stan." Each identified keyword suggestion may correspond to one or more second nodes of the plurality of second nodes. The suggested keywords may come from a variety of sources, for example and not by way of limitation, a query-log keyword generator, a typeahead keyword generator, a grammar-parser keyword generator, a metadata keyword generator, another suitable source, or any combination thereof. Although this disclosure describes identifying keyword suggestions in a particular manner, this disclosure contemplates identifying keyword suggestions in any suitable manner.

In particular embodiments, social-networking system 160 may calculate a keyword score for each identified keyword suggestion. The keyword score may be calculated differently, depending on the source of the keyword suggestion. In particular embodiments, calculating a keyword score for each identified keyword suggestions may include applying a weighing factor to each keyword based on the type of keyword suggestions. As used herein, the type of keyword suggestion refers to the type of keyword generator that generated the keyword. In particular embodiments, calculating a keyword score for each identified keyword suggestion may include blending the keyword suggestions from the plurality of keyword generators to form a set of blended keyword suggestions. As an example and not by way of limitation, keyword suggestions may be ranked based on the source of the keyword suggestion, and then the keyword suggestions may be merged by a blending algorithm. The blending algorithm may, for example, use an iterative blending process that pulls the from the top-ranked keyword suggestions from each keyword generator. More on blending processes may be found in U.S. application Ser. No. 14/244, 748, filed on 3 Apr. 2014, and U.S. application Ser. No. 14/454,826, filed on 8 Aug. 2014, each of which is incorporated by reference. Although this disclosure describes calculating a keyword score in a particular manner, this disclosure contemplates calculating a keyword score in any suitable manner.

In particular embodiments, the query-log keyword generator may include a list of queries previously entered. As an example and not by way of limitation, the previously entered queries may include queries previously received from a plurality of client systems 130 (e.g., prior queries entered by users of the online social network). The keyword score of query-log keyword suggestions may be calculated based at least in part on one or more of: (1) the number of times each query-log keyword suggestion has been searched; (2) the number of times each query-log keyword suggestion was selected (e.g., clicked on, etc.); (3) the popularity of the one or more second nodes with which each query-log keyword suggestion corresponds; (4) other suitable factors; or (5) any combination thereof. As an example and not by way of limitation, if a first user has previously entered the search queries "friends stanford," "friends stanford university," and "friends standard" the social networking system 160 may provide the keyword suggestion "friends stanford," friends stanford university," and "friends standard" in response to the first user inputting the text string "friends stan" into query field 350. If the querying user has entered the query "friends stanford" several times and selected it several times, the keyword suggestion "friends stanford" may receive a relatively higher keyword score than other keyword suggestions. In contrast, the first user may have entered "friends standard" only once. In this example, the keyword suggestion "friends standard" would therefore receive a relatively lower keyword score. The keyword suggestion "friends stanford university" may be associated with concept node 204 corresponding to Stanford University. If the concept node 204 associated with Stanford University is popular (e.g., the profile page associated with the concept node 204 associated with Stanford University has been visited many times, or the concept node 204 associated with Stanford University has received a lot of likes) the keyword suggestion "friends stanford university" may receive a relatively higher keyword score than other keyword suggestions. Although this disclosure describes identifying particular query-log keyword suggestions in a particular manner, this disclosure contemplates identifying any suitable query-log keyword suggestions in any suitable manner.

In particular embodiments, the typeahead keyword generator may use the typeahead features as described hereinabove. The typeahead keyword generator may identify one or more second nodes matching the ambiguous n-gram (e.g., the ambiguous n-gram matches to a character string (e.g., names, descriptions) corresponding to particular users, concepts, or edges and their corresponding elements in the social graph 200). The typeahead keyword suggestion may be generated corresponding to each second node matching the ambiguous n-gram. The keyword score of typeahead keyword suggestions may be based at least in part on one or more of: (1) the popularity of the one or more second nodes with which each typeahead keyword suggestion corresponds; (2) the number of times the typeahead keyword suggestion has been searched; (3) the number of times a page (e.g., a user-profile page, a concept-profile page, or another suitable page) associated with the one or more second nodes with which each typeahead keyword suggestions corresponds has been visited; (4) other suitable factors; or (5) any combination thereof. As an example and not by way of limitation, the social-networking system 160 may generate the suggested queries with the keyword suggestions "friends stanley cooper" and "friends stanley caruso" in response to the querying user entering the text string "friends stan" into query field 350. As noted above, "stan" may be considered an ambiguous n-gram. In this example, Stanley Cooper and Staley Caruso may correspond to user nodes 202 having names that match the ambiguous n-gram "stan". If the querying user has visited the profile page associated with the user Stanley Cooper several times, and the profile page associated with Stanley Cooper is popular (e.g., the profile page associated with Stanley Cooper has been visited many times) the keyword suggestion "stanley cooper" may receive a relatively higher keyword score than other keyword suggestions. In contrast, if the querying user has never been to the profile page associated with the user Stanley Caruso, and has never searched for Stanley Caruso, the keyword suggestions "stanley caruso" may receive a relatively lower keyword score. Although this disclosure describes identifying particular typeahead keyword suggestions in a particular manner, this disclosure contemplates identifying any suitable typeahead keyword suggestions in any suitable manner.

In particular embodiments, the grammar-parser keyword generator may generate keywords by processing the text query received from the querying user with a grammar model. As an example and not by way of limitation, social-networking system 160 may identify one or more edges corresponding to one or more n-grams identified from the text query, access a context-free grammar model, identify one or more grammars, and generate one or more grammar-parser keyword suggestions based on query tokens from the identified grammars. The keyword score of grammar-parser keyword suggestions may be based at least in part on one or more of: (1) the degree of separation between the first-user node and the identified second nodes corresponding to the query tokens of the identified grammars; (2) edges corresponding to the query tokens of the grammar; (3) the number of identified edges connected to the identified second nodes corresponding to the query tokens of the grammar; (4) the search history associated with the first user; (5) other suitable factors; or (6) any combination thereof. As an example and not by way of limitation, in response to the querying user inputs the text query "friends stanford", social-networking system 160 may access a grammar model and parse the text query into natural-language string "My friends who went to Stanford University," where the various terms in the natural-language string correspond to query tokens of a particular grammar. Based on these query tokens, social-networking system 160 may identifying keywords corresponding to the query tokens, such as "my," "who," "went," "to," and "university." One or more of these identified keywords corresponding to the query tokens may then be used as keyword suggestions in one or more suggested queries. As an example and not by way of limitation, one of the suggested queries generated in response to the text query "friends stanford" may be "friends stanford university," or possibly "friends who went to stanford university" (note that in this case, the suggested query modifies the original text query input by inserting keyword suggestions in the middle and at the end of the query). Note that unlike the output of the grammar model, the suggested query is not a natural-language sting and is not necessarily grammatically correct. In particular embodiments, the plurality of grammars may be a grammar forest organized as an ordered tree comprising a plurality of non-terminal tokens and a plurality of query tokens, each grammar being an ordered sub-tree adjoining one or more other grammars via a non-terminal token. The social-networking system 160 may determine which sub-branches of the branched entity might be a good match and combine them with the grammar rules. The social-networking system 160 may also filter out bad grammar suggestions and render them in a different way. As an example and not by way of limitation, if a user types a query "friends allan stanford," the social-networking system 160 may determine and retrieve all terms for "stanford" and determine, based on the scores associated with each term, whether they are a good match. The social-networking system 160 may determine that query tokens corresponding to the school "Stanford University" are not a good match, while query tokens corresponding to the user "Allan Stanford" are a good match based on the final score from the data source, and then identify other query tokens from grammars containing the "Allan Stanford" query token for use as keyword suggestions. More on grammar models may be found in U.S. application Ser. No. 13/674,695, filed on 12 Nov. 2012, and U.S. application Ser. No. 13/731,866, filed on 31 Dec. 2012, each of which is incorporated by reference. Although this disclosure describes identifying particular grammar-parser keyword suggestions in a particular manner, this disclosure contemplates identifying any suitable grammar-parser keyword suggestions in any suitable manner.

In particular embodiments, the metadata keyword generator may identify keywords by identifying social-graph information associated with the querying user and corresponding to one or more n-grams identified from the text query, and generate one or more metadata keyword suggestions based on the identified social-graph information. In particular embodiments, the social-graph information may include, for example, information about connections of matching social-graph entities to other entities (e.g., friends, check-in, work-at, live-in, etc.). As an example and not by way of limitation, if there is a user John Smith who works at Facebook, in response to the query "john smith," the social-networking system 160 may generated the suggested query "john smith facebook," where the keyword suggestion "facebook" is provided based on the connection between the user John Smith and Facebook in the social graph 200. In particular embodiments, the metadata may include location data associated with the users of the online social network. More on location data can be found in U.S. application Ser. No. 14/323,940, filed on 3 Jul. 2014, which is incorporated by reference. As an example and not by way of limitation, if the user is currently in the city of Palo Alto, in response to the query "restaurant," the social-networking system 160 may generate the keyword suggestion "restaurant palo alto," where the keyword suggestion "palo alto" is provided based on the currently location data associated with the querying user. Although this disclosure describes identifying particular metadata keyword suggestions in a particular manner, this disclosure contemplates identifying any suitable metadata keyword suggestions in any suitable manner.

Figure 5:
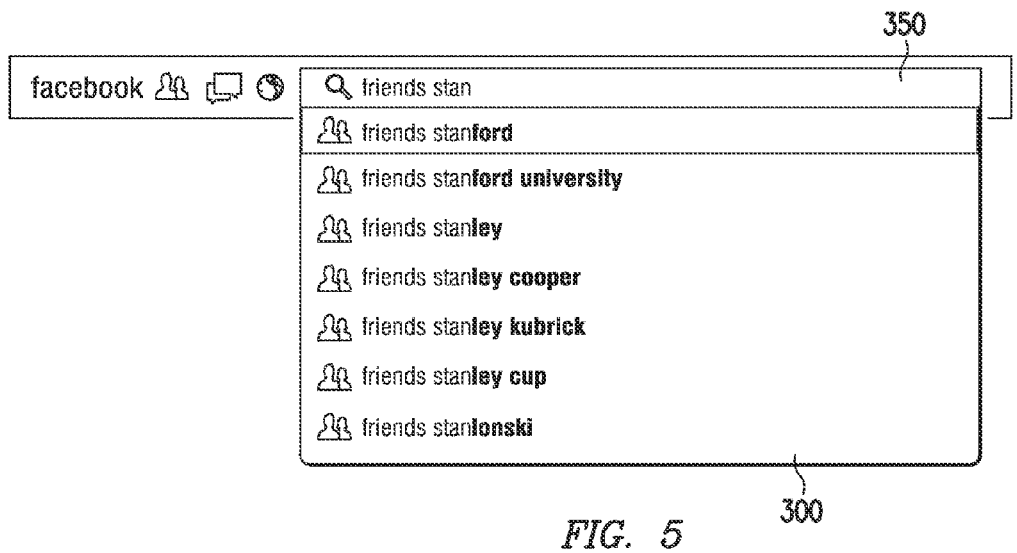
FIG. 5 illustrates example customized keyword completion suggestions of the social network.

FIG. 5 illustrates example keyword suggestions of the online social network. In particular embodiments, social-networking system 160 may generate one or more suggested queries based on the identified keyword suggestions. Each suggested query may include one or more n-grams identified from the text query and one or more identified keyword suggestions having a keyword score greater than a threshold keyword score. For example, FIG. 5 illustrates the suggested queries "friends stanford," "friends stanford university," "friends stanley," "friends stanley cooper," "friends stanley kubrick," "friends stanley cup," and "friends stanlonski", which are displayed in drop-down menu 300. The suggested queries include keyword suggestions that have been generated based on the unstructured query "friends stan," which has been inputted by a querying user in query field 350. In this example, the n-gram "stan" may be identified as an ambiguous n-gram because it may refer to multiple social-graph entities, such as, for example, the concept node 204 corresponding to the school Stanford University, the concept node 204 corresponding to the city of Stanford, Calif., or one or more user nodes 202 for users with the name "Stanford." The keyword suggestion "stanford university" is provided as part of a suggested query because the n-gram "stan" matches the name of the concept node 204 corresponding to Stanford University. In the example shown in FIG. 5, the querying user may have previously searched for "friends stanford" several times. Therefore, the keyword suggestion "stanford," generated by the query-log keyword generator may have a high keyword score. The user may have a high affinity for Stanford University, for example, because the user is connected to Stanford University by a like-type edge 206 and/or an attended-type edge 206. Therefore the suggested query "friends stanford university," generated, for example, by the grammar-parser keyword generator, may also receive a relatively high keyword score, and may be presented high on the list of suggested queries. The suggested query "friends stanley cooper," generated, for example, by the typeahead keyword generator, may correspond to a user node 202, to which the querying user has a "friend" connection, therefore, the suggested query "friends stanley cooper" also received a relatively high keyword score. The suggested queries "friends stanley kubrick" and "friends stanley cup" are references to particular concept nodes 204 of the social graph 200 corresponding to the director Stanley Kubrick and the event Stanley Cup, respectively. Similarly, the keyword suggestion "stanlonski" may correspond to a user node 202 for a user named "Stanlonski", to which the querying user may be connected. In the example illustrated in FIG. 5, the three keyword suggestions "stanley kubrick," "stanley cup," and "stanlonski" may correspond to social-graph entities having a low affinity for the querying user (e.g., the entities are two or more degrees of separation from the querying user) and thus may receive relatively low keyword scores and be ranked lower than suggested queries comprising other keyword suggestions. In the example described herein, the keyword suggestions come from a plurality of sources and are blended together to provide one list of suggested queries, shown in drop-down menu 300. The keyword suggestions are provided as examples, and are not intended as limitations. The keyword suggestions used in the suggested queries may include keywords associated with any user node 202 or concept node 204 (e.g. the name of the user or concept) that may be interesting to the user. The suggested queries in drop-down menu 300 illustrate a progression from simpler keyword suggestions (e.g., "friend stanford") to more complex keyword suggestions (e.g., "friend stanford university"). This method of sorting is provided as an example, and is not intended as a limitation. Finally, the text in the suggested queries is bolded to illustrate how the keyword suggestions are modifying the ambiguous n-gram "stan." Although this disclosure describes and FIG. 5 illustrated generating particular suggested queries with particular keyword suggestions in a particular manner, this disclosure contemplates any suitable suggested queries with any suitable keyword suggestions in any suitable manner.

In particular embodiments, social-networking system 160 may filter or otherwise remove keyword suggestions from the set of identified keyword suggestions. Keyword suggestions may be filtered/removed in a variety of ways. In particular embodiments, the social-networking system 160 may filter out keyword suggestions that would result in a null-search from the identified keyword suggestions. Social-networking system 160 may check the search results that would be generated in response to selecting a suggested query with a particular keyword suggestion to make sure the keyword suggestion provided will actually generate one or more search results. In particular embodiments, the social-networking system 160 may determine whether the identified keyword suggestions result in a null-search. A null-search, as used herein, refers to a search query that produces zero search results. A null-search may result, for example, if a keyword suggestion is relatively long or detailed. As an example and not by way of limitation, the search string "friends stanford vanderbilt colgate boston" may result in a null-search because no content objects associated with the online social network match all of the terms of the search query. In particular embodiments, the social-networking system 160 may remove one or more keyword suggestions resulting in a null-search from the identified keyword suggestions, thereby preventing those keyword suggestions from be incorporated into suggested queries presented to the querying user. The social-networking system 160 may also run privacy checks to make sure that keyword suggestions are not presented to a user that would rely on non-visible information. More on filtering suggested queries based on privacy settings can be found in U.S. application Ser. No. 13/556,017, filed on 23 Jul. 2012, which is incorporated by reference. Although this disclosure describes filtering keyword suggestions in a particular manner, this disclosure contemplates filtering keyword suggestions in any suitable manner.

In particular embodiments, the social-networking system 160 may send one or more of the suggested queries to the client system 130 of the user for display. The suggested queries (e.g., suggested structured queries, or suggested queries comprising keyword suggestions) may be sent by social-networking system 160 responsive to receiving the unstructured text query. The suggested queries may be displayed in ranked order based on the keyword score of the identified keyword suggestions included in each suggested query. As an example and not by way of limitation, if the suggested query "friends stanford" has a higher keyword score than the suggested query "friends stanford university," the suggested queries may be displayed with "friends stanford" displayed first and "friends stanford university" displayed second. In particular embodiments, the suggested queries may be displayed on a user interface of a native application associated with the online social network on the client system of the first user. As an example and not by way of limitation, the native application may be an application associated with the social-networking system on a user's mobile client system (e.g. a smart phone, tablet, etc.). In particular embodiments, the suggested queries may be displayed on a webpage of the online social network accessed by a browser client 132 on the client system 130 of the first user. Although this disclosure describes sending the suggested queries in a particular manner, this disclosure contemplates sending the suggested queries in any suitable manner.

Figure 6:
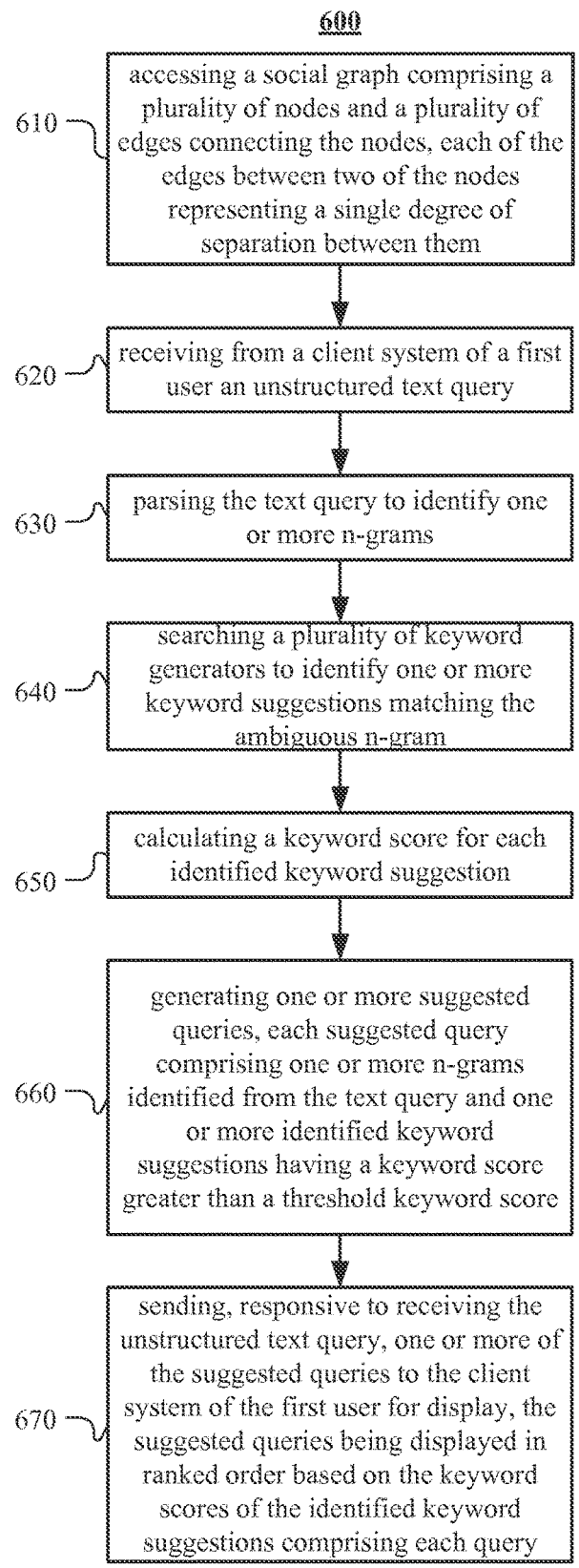
FIG. 6 illustrates an example method for providing customized keyword completion suggestions.

FIG. 6 illustrates an example method 600 for providing keyword suggestions. The method may begin at step 610, where social-networking system 160 may access a social graph 200 comprising a plurality of nodes and a plurality of edges 206 connecting the nodes. The nodes may comprise a first user node 202 and a plurality of second nodes (one or more user nodes 202, concept nodes 204, or any combination thereof). At step 620, social-networking system 160 may receive from a client system of a first user an unstructured query. At step 630, social-networking system 160 may parse the text query to identify one or more n-grams. At step 640, social-networking system 160 may search a plurality of keyword generators to identify one or more keyword suggestions matching the ambiguous n-gram. At step 650, social-networking system 160 may calculate a keyword score for each identified keyword suggestion. At step 660, social-networking system 160 may generate one or more suggested queries. Each suggested query may comprise one or more n-grams identified from the text query. One or more keyword suggestions may have a keyword score greater than a threshold keyword score. At step 670, the social-networking system 160 may send one or more of the suggested queries to the client system of the first user for display. Step 670 may be responsive to receiving the unstructured text query. The suggested queries may be displayed in ranking order based on the keyword scores of the identified keyword suggestions comprising each query. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for providing keyword suggestions including the particular steps of the method of FIG. 6, this disclosure contemplates any suitable method for providing keyword suggestions including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Determining Query Intent and Generating Search Results

In particular embodiments, social-networking system 160 may determine the intent of a search query (herein referred to simply as "search intent(s)," or "intent(s)") and provide a customized search experience based on the search intent. The social-networking system 160 may determine the search intent based on entity and topic matching, and then provide search results to the user based on the determined search intent. As an example and not by way of limitation, if a querying user is performing a people search (e.g., a search for users of the online social network the querying user may know in real life) as opposed to a celebrity search or a pages search (e.g., a search for content on the online social network associated with a particular celebrity or other entity), the user experience may be improved by determining the intent of the query in order to determine what will be displayed to the querying user. If there is a single best result for the query (e.g., an entity match corresponding to a typeahead selection), the social-networking system 160 may list the single best result query. However, if the query is ambiguous or would generate multiple results (e.g., structured queries or keyword queries), the social-networking system 160 may return a list of options for the user. As another example and not by way of limitation, if the user inputs the query "friends alex," the social-networking system 160 may determine this is a people search and return blended search results that have been customized based on the user's intent to search for people. For example, these blended results may include a plurality of search-result modules, wherein each search-results module The search-result modules may include search-result modules that relate to particular structured queries generated by parsing the original query "alex." For example, the social-networking system 160 may generate the structured queries "Friends of Alex Binder", "Friends of Alex Smith" (where the references to "Alex Binder" and "Alex Smith" correspond to a particular user nodes 202 for those users), "My friends who live in Alexandria, Egypt" (where the reference to "Alexandria, Egypt" corresponds to a particular concept node 204 for that location), and "Friends named 'Alex'". Each search-result module may also comprise one or more search results corresponding to users of the online social network that match the structured query corresponding to that search-result module. The module blending may use functionality described herein. More on search intent can be found in U.S. application Ser. No. 13/887,015, filed on 3 May 2013, which is incorporated by reference. Although this disclosure describes generating search results based on search intents in a particular manner, this disclosure contemplates generating search results based on search intents in any suitable manner.

In particular embodiments, the social-networking system 160 may determine one or more search intents of a search query received from a user of the online social network. As discussed previously, social-networking system 160 may receive a search query from a client system 130 of a querying user. Furthermore, as discussed previously, social-networking system 160 may identify one or more nodes that match the search query. Determining intent may be based on a variety factors, including topics associated with the identified nodes, the node-types of the identified nodes matching the query, other suitable factors, or any combination thereof. Although this disclosure describes determining search intents in a particular manner, this disclosure contemplates determining search intents in any suitable manner.

In particular embodiments, social-networking system 160 may determine one or more search intents of a search query based in part on one or more node-types of the nodes identified as matching the search query. As an example and not by way of limitation, social-networking system 160 may receive the search query "lady gaga." The social-networking system 160 may identify a profile page associated with the celebrity Lady Gaga as being the best matching object for the search query. The social-networking system 160 may then determine that the intent of the search was a celebrity search, based on the identified node being associated with a celebrity. As another example and not by way of limitation, social-networking system 160 may receive the search query "london." The social-networking system 160 may identify a profile page associated with the city London, United Kingdom and a profile page associated with the city London, Ontario. The social-networking system 160 may then determine that the intent of the search was a location search (e.g., a search for content on the online social network associated with a particular location) based on the node-types of the identified nodes, which in this example are both associated with particular cities. In particular embodiments, the search query may be an unstructured text query. When the search query is an unstructured text query, the social-networking system 160 may identify one or more second nodes matching the ambiguous n-gram (as described previously). As an example and not by way of limitation, if the search query is "alex," the social-networking system may identify a plurality of user nodes 202, for example "Alex Smith" or "Alex Cooper," which match the ambiguous n-gram "alex." The social-networking system 160 may determine that the intent of the search was a people search, because the search results include a number of people-type nodes. Although this disclosure describes determining search intents based on node-types in a particular manner, this disclosure contemplates determining search intents based on node-types in any suitable manner.

In particular embodiments, the social-networking system 160 may search a plurality of verticals 164 (i.e., data stores) to identify a plurality of sets of objects in each vertical 164, respectively, that match the search query. Each vertical 164 may store one or more objects associated with the online social network, and each object may correspond to a user node 202 or concept node 204. In particular embodiments, determining intent may be based on the object-type associated with each vertical having at least one object that matches the search query. In particular embodiments, the social-networking system 160 may blend the plurality of sets of identified objects from each vertical to form a set of blended search results including a threshold number of identified objects. Each vertical may store objects of a particular object-type, for example a user, a photo, a post, a page, an application, an event, a location, or a user group. The social-networking system 160 may perform a regular entity search, review the distribution of object-types that is obtained from the search, and use that as a factor in determining the query intent. As an example and not by way of limitation, if the querying user enters the query "alex," many users (corresponding each to particular user nodes 202) may be identified in a users vertical 164 by the social-networking system 160, and the social-networking system 160 may determine that the search is likely a people search. In contrast, if the querying user enters the query "soccer," many posts related to the topic soccer (e.g. user posts about soccer, or the World Cup) may be identified by the social-networking system 160, and the social-networking system 160 may determine that the search is likely a topic search (e.g., a search for content on the online social network associated with a particular topic). Where a variety of entity types are pulled, the social-networking system 160 may use the distribution of the entities, the scores/ranks determined by the verticals 164 (each of which may have its own scoring/ranking algorithm used when retrieving results in response to a search query), and social-graph information, to determine what is the most common or the most likely type of entity the that the query is referring to. As an example and not by way of limitation, if a querying user enters the query "London," many objects related to the city London, United Kingdom may be identified (e.g., a profile page associated with the city, photos or posts tagging the city, users who live in the city, etc.). Additionally, user nodes 202 associated with users having the first or last name "London" may also be identified. In this scenario, the social-networking system 160 may use the distribution of entities, for example, the fact that there are more entities associated with the city London, United Kingdom than users nodes 202 associated with users having the last name London, and determine that the search is likely a location search. Similarly, the social-networking system 160 may use social-graph information as described herein above to determine that the search is likely a location search. As an example and not by way of limitation, if a querying user enters the query "London," and the social-networking system 160 determines that the user is located near the city of London, United Kingdom, the social-networking system 160 may determine that the search is likely a location search. Although this disclosure describes determining search intents based on object-types in a particular manner, this disclosure contemplates determining search intents based on object-types in any suitable manner.

In particular embodiments, the social-networking system 160 may perform a topic tagger search, in which the social-networking system 160 matches the query to a defined set of topics (e.g., a dictionary or encyclopedia), referred to herein as an electronic topic index. In particular embodiments, the social-networking system 160 may identify at least one candidate node corresponding to the query, wherein each candidate node corresponds to an electronic topic index. Matching the search query may include, in no particular order, (1) receiving an electronic topic index comprising a set of nodes, wherein each node represents a topic; (2) identifying an anchor term in the query; (3) identifying candidate nodes based on the anchor term, wherein candidate nodes comprise electronic-topic-index nodes representing subjects related to the anchor term; (4) determining a context of the anchor term in the query; (5) determining a score for each of the one or more of the candidate nodes based on the determined context; and (6) determining whether there is a candidate node to represent the meaning of the anchor term based on the determined scores. In particular embodiments, receiving an electronic topic index may include retrieving a database of articles, wherein one or more pairs of articles are linked, creating a node for each of the one or more articles, the node comprising the topic of the article, and for each pair of nodes corresponding to linked articles, connecting the pair of nodes with an edge. The database of articles may include a web-based database, wherein each article is represented by a web page within the web-based database, and wherein two articles are linked if the web page representing one of the articles contains a URL link to the other article. The determined intent may be based on the electronic-topic-index nodes associated with the candidate nodes that represent the meaning of the anchor term. As an example and not by way of limitation, if the search query is "lady gaga," the social-networking system 160 may identify the anchor node "lady gaga" and identify the candidate node associated with the electronic-topic-index node associated with the celebrity lady gaga. The social-networking system 160 may then determine that the intent is a celebrity search based on the electronic-topic-index node associated with lady gaga. As another example and not by way of limitation, if the search query is "london," and the electronic-topic-index node associated with the city of London, United Kingdom is identified as matching the search query, the social-networking system 160 may determine that the search is a location search. More on using an electronic topic index, and further, inferring topics from the electronic topic indexes with which the nodes are associated can be found in U.S. application Ser. No. 13/167,701, filed on 24 Jun. 2011, which is incorporated by reference.

In particular embodiments, the social-networking system 160 may obtain results from a plurality of searches, for example an entity search and topic tagger, and may review both results together. If the social-networking system 160 determines that there is a match between the results from the topic tagger and the entity search, then those matches provide strong signals that define the intent of the query. For example, if the topic tagger identifies the electronic-topic-index associated with Lady Gaga, and the entity search identifies the profile page associated with Lady Gaga, there is a strong indication that the search intent is a celebrity search. However, if the social-networking system 160 determines that there is no topic match, then distribution may be used with the entity results in combination with text estimation. As used herein, text estimation is a language-model based text estimation of the classification for the query based on named entities within the social graph and not necessarily based on the query the user enters. The social-networking system 160 may combine the query with the text estimation and determine the query intent. As an example and not by way of limitation, this may be used for user detection because user queries are a common query intent. The social-networking system 160 may use text estimation and entity search results to determine the query intent. As an example and not by way of limitation, for the query "alex," the social-networking system 160 may run an entity search and a topic tagger search. The entity search will likely return a large list of people with the first name Alex. The topic tagger may identify an electronic-topic-index nodes associated with a celebrity, for example Alex Trebek, Alex Rodriguez, and Alexi Lalas. The text estimation source may provide the social-networking system 160 a level of confidence that the name is a user name as opposed to a concept (e.g., a page, celebrity, or location) in the social graph. The social-networking system 160 may determine whether there is a specific user being referred to unambiguously. In this example there is not. As such, a list of users matching the query for "alex" may be returned (or a plurality of search-result modules corresponding to structured queries parsed from "alex" could be returned). The topic tagger may also be used to differentiate possible entity matches from topic matches. As an example and not by way of limitation, the for the search query "Jessica Simpson," the topic tagger may identify a likely topic (e.g., celebrity Jessica Simpson) rather than a user search (e.g., random, non-celebrity users named Jessica Simpson). Similarly, an entity search would indicate that the search query "Jessica Simpson" is a celebrity query because the entity data associated with Jessica Simpson will indicate she is a celebrity. Although this disclosure describes determining intent in a particular manner, this disclosure contemplates determining intent in any suitable manner.

Figures 7A, 7B:
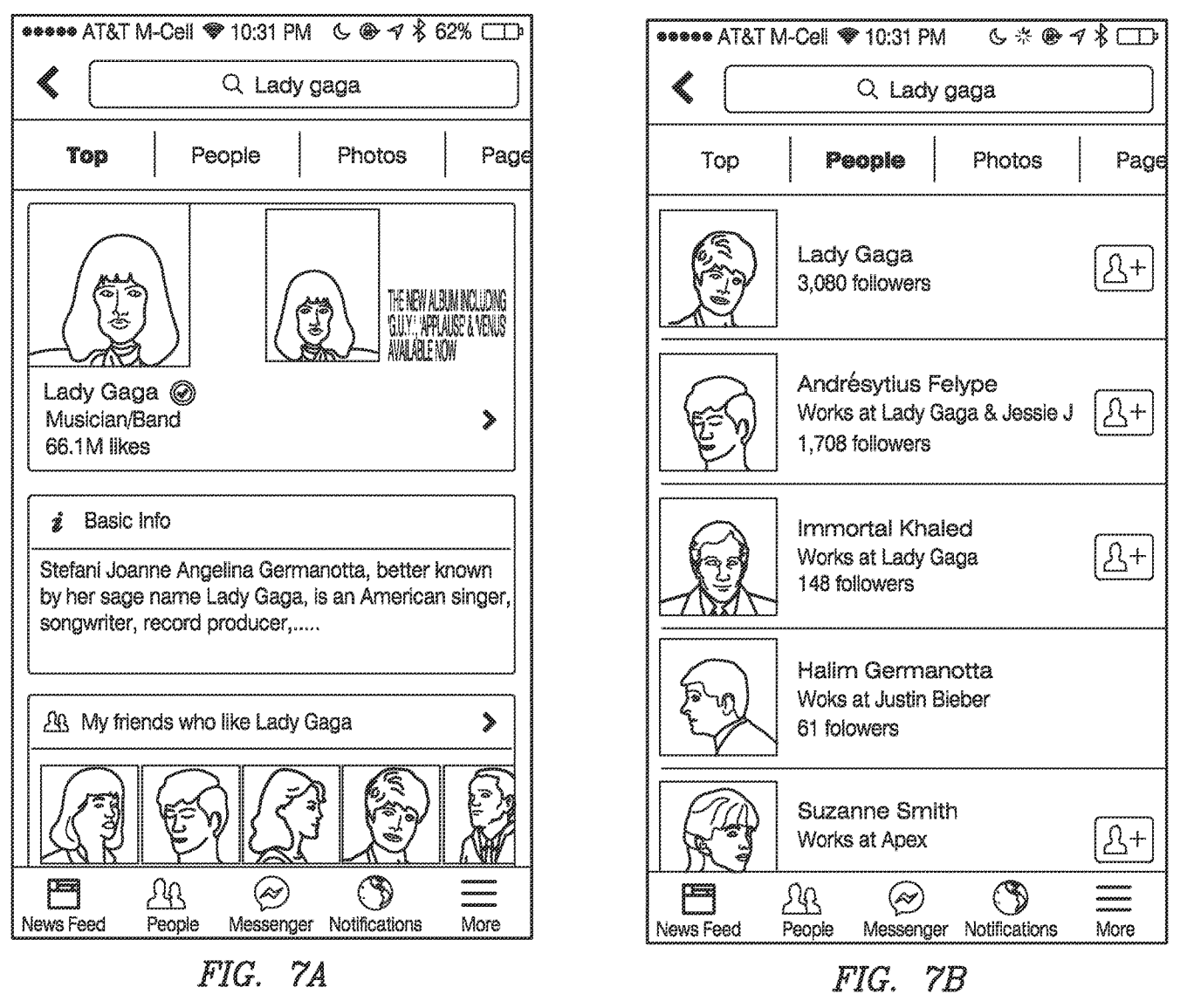
Figure 7C:
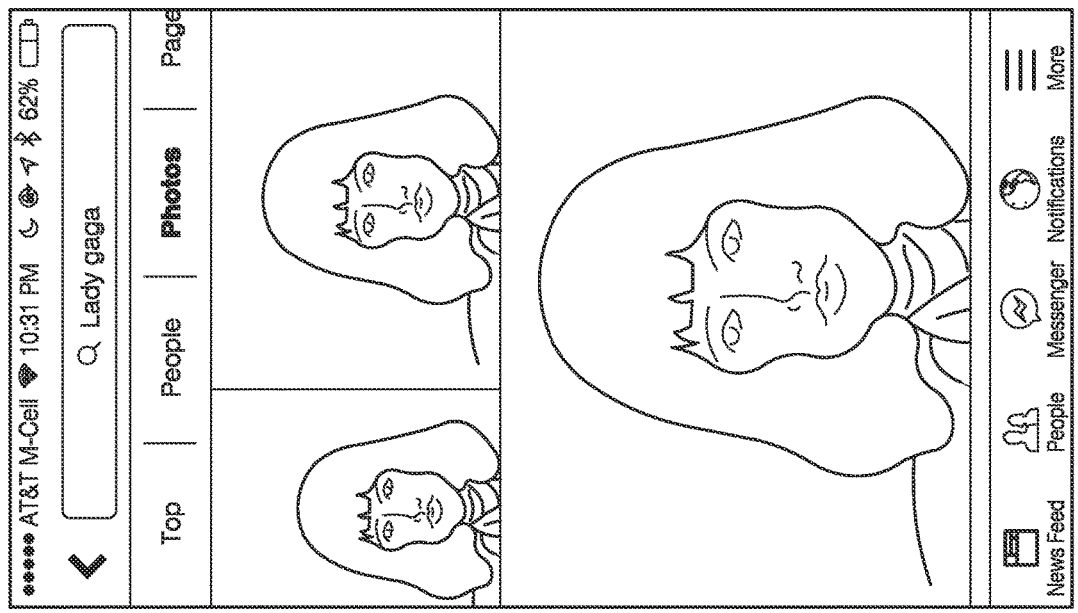
Figure 7D:
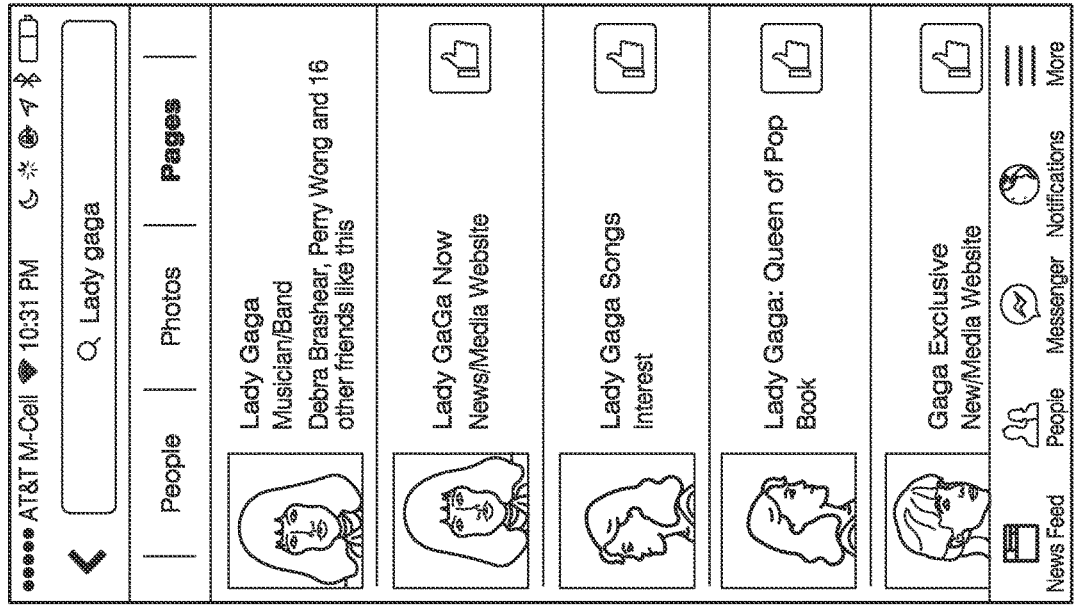

In particular embodiments, intent may be determined based on whether the query input is a strong or weak match to a grammar. The social-networking system 160 will typically only use intent to blend search results when there is a weaker match to a grammar. When the social-networking system 160 has a high confidence that the query matches a particular grammar of a grammar model, it will not blend results with different search-result modules and instead will return search results corresponding to the structured query generated based on the grammar model. This may be because users who specifically input structured queries have essentially already explicitly inputted their query intent by inputting the structured query, which are typically more specific and detailed than other types of queries, such as keyword queries. As an example and not by way of limitation, if the first user types "friends who live in palo alto," this may closely match a particular grammar of a grammar model (e.g., being parsed by the grammar to generate the natural-language string "My friends who live in Palo Alto, Calif."), and thus would be considered a strong match to a grammar. In this case, social-networking system 160 may instead generate a structured query and identify the particular objects corresponding to the structured query. In contrast, the search query "board games" is an example of a weak match to a grammar, since this may not closely match any particular grammar when parsed in a grammar model. In other words, because a specific structured query cannot be adequately determined by the social-networking system 160, it may instead determine the intent of the query as discussed previous, such as by doing an entity search and keyword search. The query having a weak match to a grammar may therefor return blended modules based on the determined intent. More on grammar models may be found in U.S. application Ser. No. 13/674,695, filed on 12 Nov. 2012, and U.S. application Ser. No. 13/731,866, filed on 31 Dec. 2012, each of which is incorporated by reference. Although this disclosure describes determining search intents based on matching grammars in a particular manner, this disclosure contemplates determining search intents based on matching grammars in any suitable manner FIGS. 7A-7D illustrate example views of search-results pages. In particular embodiments, social-networking system 160 may generate one or more search results corresponding to a search query. The search results may be generated based on the determined search intent. Each search result may include a reference to one of the identified nodes of social graph 200. The search-results page may include a plurality of search-result modules, each search-result module being associated with a particular object type, for example a user, a photo, a post, a page, an application, an event, a location, or a user group. In FIGS. 7A-7D, the search query is the term "Lady gaga." The social-networking system 160 has determined that the intent of the searcher was a celebrity search based on an entity search, a topic tagger search, or a combination thereof. Specifically, the user was performing a search with the intent of receiving results related to the singer Lady Gaga. The results provided in FIGS. 7A-7D are optimized based on the search intent. As an example and not by way of limitation, FIG. 7A shows a search-results page corresponding to selection of the "Top" tab that provides a blending of search-result types based on the determined celebrity-type search intent. The blending may be performed as described hereinabove. The top hit is a link to the profile page associated with the concept node 204 associated with Lady Gaga. The second hit provides a link to basic information about the performer Lady Gaga. The third hit provides the grammar search "My friends who like Lady Gaga." The user may also decide to view the search-results of a specific object-type. The object-types may be users, photos, posts, pages, applications, events, locations or user groups. Here, the different search-result modules are blended in this particular order based on the query having been identified as a celebrity search. As such, the best result corresponding to the search, corresponding to the node for Lady Gage, is presented as the first search-result module. The second and third modules are provided as being of particular interest to users doing celebrity searches. FIG. 7B shows the search-results page for people-type search results corresponding to the selection of the "People" tab. The first hit is a user node 202 Lady Gaga. The following hits are user nodes 202 that are connected to Lady Gaga by an edge 206. For example, the second and third hits are connected to Lady Gaga by a "works-at" edge. FIG. 7C shows a search-results page for photo-type search results corresponding to selection of the "Photos" tab. The photos shown in FIG. 7C relate Lady Gaga. FIG. 7D shows a search-results page for page-type search results corresponding to selection of the "Pages" tab. The top search result is the page associated with the concept node 204 for Lady Gaga. The remaining hits are pages associated with additional concepts that are related to Lady Gaga. Note that while the search results illustrated in FIGS. 7B-7D are of individual object types (i.e., people, photos, and pages, respectively), they may also be blended based on a determined query intent, as described previously. Although this disclosure describes and FIGS. 7A-7D illustrate generating particular search results in a particular manner, this disclosure contemplates generating any suitable search results in any suitable manner.

Figure 8B:
Figure 8A:

FIGS. 8A-8D illustrate additional example views of search-results pages. In FIGS. 8A-8D, the search query is "London." The social-networking system 160 may have determined that the intent of the searcher was a location search. This may have been determined because the search results returned few user pages, but a large number of location results. Additionally or alternatively, the topic tagger may have identified an electronic-topic-index node associated with London, United Kingdom. FIG. 8A shows a search-results page corresponding to selection of the "Top" tab that provides a blending of search-result types. The top hit is the profile page associated with the concept node 204 London, United Kingdom. The second hit is a grammar search "My friends who like London, United Kingdom." The third hit (only partially displayed) is a post by the celebrity Jon Favreau, where the post tags the city of London (i.e. the concept node 204 corresponding to the post is connected by a tagged-in type edge 206 to the concept node 204 corresponding to London). Here, the different search-result modules are blended in this particular order based on the query having been identified as a location search. As such, the best result corresponding to the search, corresponding to the concept node 204 for London, is presented as the first search-result module. The second and third modules are provided as being of particular interest to users doing location searches. Not all hits must be related to a location. As an example and not by way of limitation, FIG. 8B shows the search-results page for people-type search results corresponding to selection of the "People" tab. The first three results have the last name "London." The fourth hit, may be connected to the concept node 204 London, United Kingdom, by an edge 206, for example a "lives-in" edge. FIG. 8C shows the search-results page for photo-type search results corresponding to selection of the "Photos" tab. The photos shown in FIG. 8C relate the places associated with the term "London." FIG. 8D shows the search-results page for page-type search results corresponding to selection of the "Pages" tab. The top search result is the profile page associated with the concept node 204 London, United Kingdom. The second hit is associated with the concept node 204 London, Ontario. Although this disclosure describes and FIGS. 8A-8D illustrate generating particular search results in a particular manner, this disclosure contemplates generating any suitable search results in any suitable manner.

Figure 9:
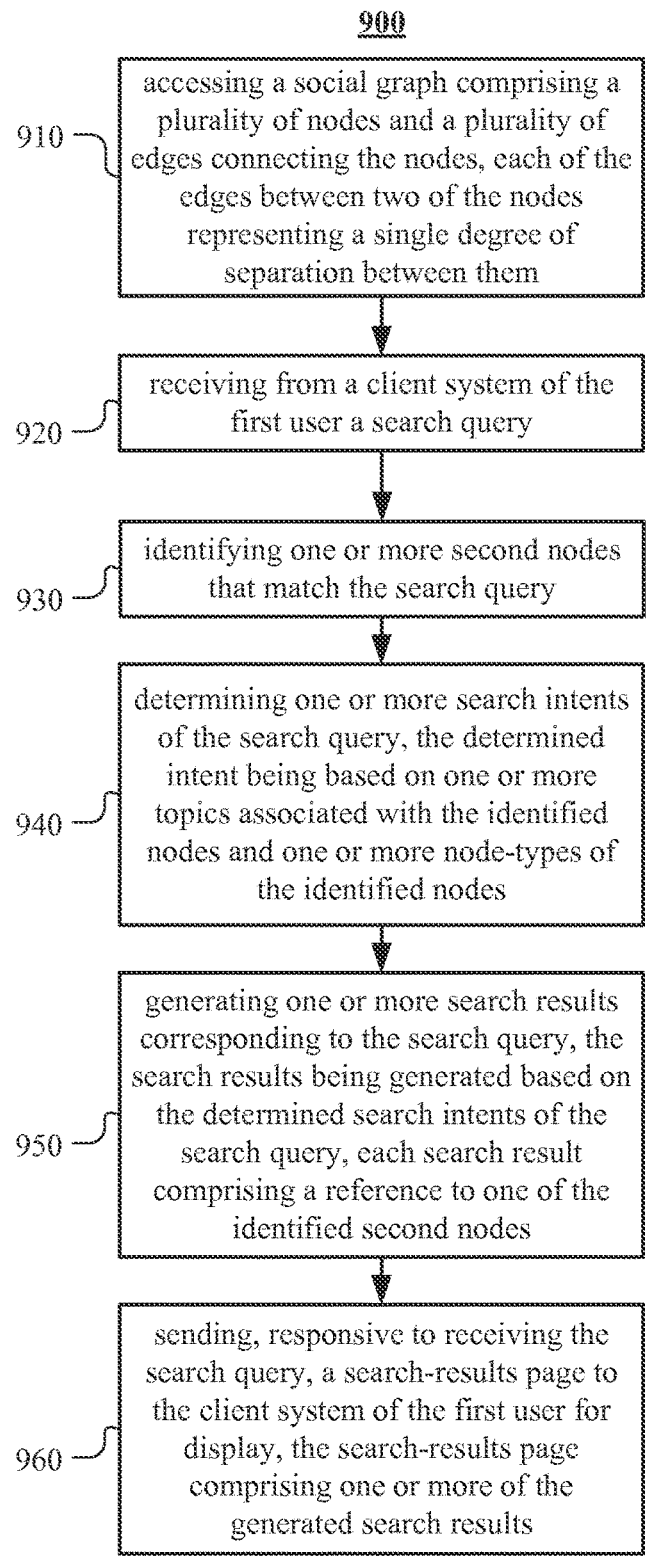
FIG. 9 illustrates an example method for determining the intent of a search query.

FIG. 9 illustrates an example method 900 for determining query intent. The method may begin at step 910, where social-networking system 160 may access a social graph 200 comprising a plurality of nodes and a plurality of edges 206 connecting the nodes. The nodes may comprise a first user node 202 and a plurality of second nodes (one or more user nodes 202, concept nodes 204, or any combination thereof). At step 920, social-networking system 160 may receive from a client system of the first user a search query. At step 930, social-networking system 160 may identify one or more second nodes that match the search query. At step 940, social-networking system 160 may determine one or more search intents of the search query. The determined intent may be based on one or more topics associated with the identified nodes and one or more node-types of the identified nodes. At step 950, social-networking system 160 may generate one or more search results corresponding to the search query. The search results may be generated based on the determined search intents of the search query. Each search result may include a reference to one of the identified second nodes. At step 960, the social-networking system 160 may send a search-results page to the client system of the first user for display. Sending the search-results page may be responsive to receiving the search query. The search-results page may include one or more of the generated search results. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for determining query intent including the particular steps of the method of FIG. 9, this disclosure contemplates any suitable method for determining query intent including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 10:
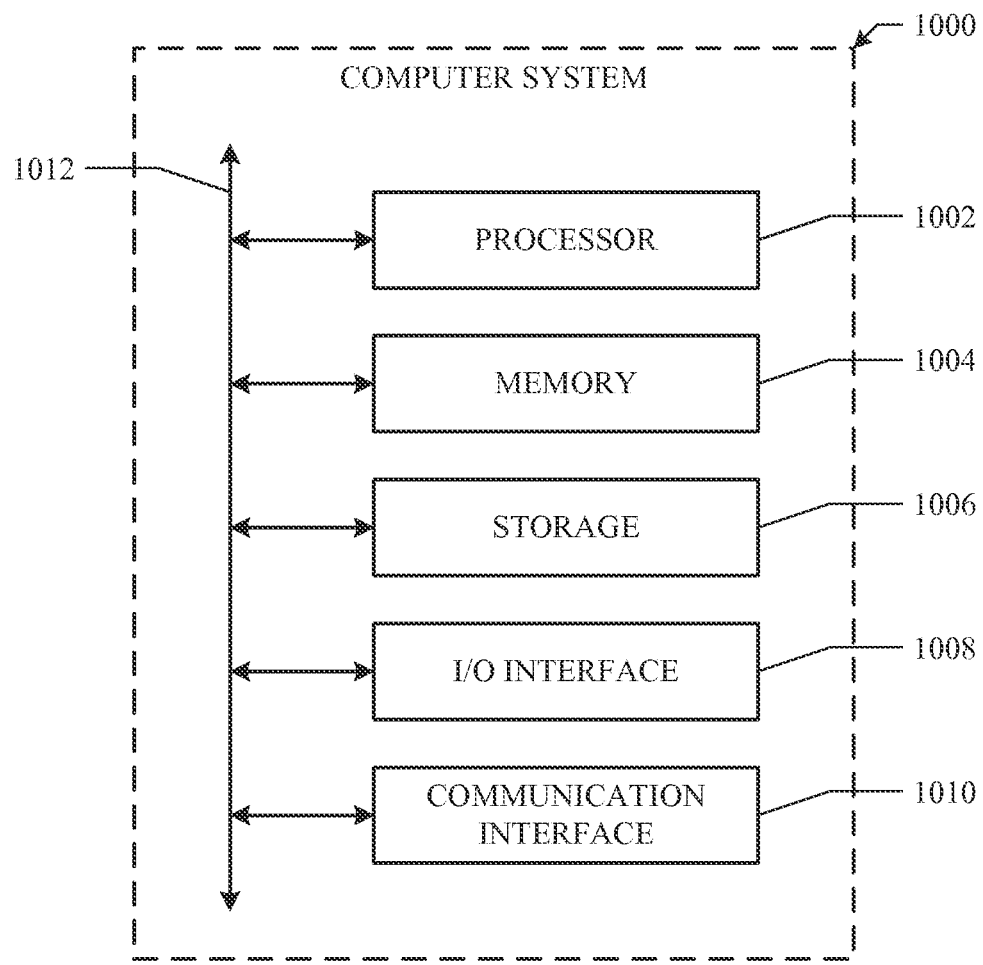
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:

accessing a social graph comprising a plurality of nodes and a plurality of edges connecting the nodes, the nodes comprising:
  a first node corresponding to a first user associated with an online social network; and
  a plurality of second nodes corresponding to a plurality of objects associated with the online social network, respectively, each object being of a particular object-type, each second node being of a node-type corresponding to the object-type of the respective corresponding object;

receiving from a client system of the first user a search query;

identifying one or more second nodes that match the search query;

determining one or more search intents of the search query, the determined search intents being based on one or more topics associated with the identified second nodes and a ratio of one or more node-types of the identified second nodes that match the search query, wherein the determined search intent indicates a query type of the search query;

generating one or more search-result modules corresponding to the search query, the search-result modules being generated based on the one or more topics and one or more node-types associated with the determined search intents of the search query, each search-result module being associated with a particular object-type and comprising one or more search results, each search result comprising a reference to one of the identified second nodes having a node-type corresponding to the particular object-type of the respective search-result module; and sending, responsive to receiving the search query, a blended search-results page to the client system of the first user for display, the blended search-results page comprising a threshold number of the generated search-result modules, the search-result modules being presented in a blended order, the ordering of each search-result module being based on the determined search intents of the search query and a distribution of the one or more topics and one or more node-types of the determined search intents with respect to the particular object-type associated with the search-result module.

2. The method of claim 1, wherein the search query is an unstructured text query, and the method further comprises parsing the text query to identify one or more n-grams, wherein at least one of the n-grams is an ambiguous n-gram; and wherein identifying one or more second nodes that match the search query comprises identifying one or more second nodes matching the ambiguous n-gram, each identified node corresponding to one or more second nodes of the plurality of second nodes.

3. The method of claim 1, wherein identifying one or more second nodes that match the search query comprises searching a plurality of verticals to identify a plurality of sets of objects in each vertical, respectively, that match the search query, wherein each set of objects corresponds to a search-result module, and wherein each vertical stores one or more objects associated with the online social network, each object corresponding to a second node of the plurality of second nodes.

4. The method of claim 3, wherein each vertical of the plurality of verticals stores objects of a particular object-type, the particular object-type being selected from a group consisting of: a user, a photo, a post, a page, an application, an event, a location, or a user group.

5. The method of claim 4, wherein the determined search intent is further based on the object-type associated with each vertical having at least one identified second node.

6. The method of claim 1, wherein identifying one or more second nodes that match the search query comprises identifying at least one candidate node corresponding to the search query, wherein each candidate node corresponds to an electronic topic index.

7. The method of claim 6, wherein identifying one or more second nodes that match the search query further comprises:
receiving an electronic topic index comprising a set of nodes, wherein each node represents a topic;
identifying an anchor term in the query;
identifying candidate nodes based on the anchor term, wherein candidate nodes comprise electronic-topic-index nodes representing subjects related to the anchor term;
determining a context of the anchor term in the query;
determining a score for each of the one or more of the candidate nodes based on the determined context; and
determining whether there is a candidate node to represent the meaning of the anchor term based on the determined scores.

8. The method of claim 7, wherein receiving an electronic topic index comprises:
retrieving a database of articles, wherein one or more pairs of articles are linked;
creating a node for each of the one or more of the articles, the node comprising the topic of the article; and
for each pair of nodes corresponding to linked articles, connecting the pair of nodes with an edge.

9. The method of claim 8, wherein the database of articles comprises a web-based database, wherein each article is represented by a web page within the web-based database, and wherein two articles are linked if the web page representing one of the articles comprises a URL link to the other article.

10. The method of claim 9, wherein the determined search intent is further based on the electronic-topic-index nodes associated with at least one candidate node that represents the meaning of the anchor term.

11. The method of claim 1, further comprising scoring the search results based on the one or more determined search intents.

12. The method of claim 11, wherein the search-results page comprises one or more search results having a score greater than a threshold score.

13. The method of claim 1, wherein the particular object-type associated with each search-result module is selected from a group consisting of: a user, a photo, a post, a page, an application, an event, a location, or a user group.

14. The method of claim 1, wherein the determined search intent is further based on matching the search query to one or more grammars of a grammar model.

15. The method of claim 1, wherein the search-results page is a user interface of a native application associated with the online social network on the client system of the first user.

16. The method of claim 1, wherein the search-results page is a webpage of the online social network accessed by a browser client of the client system of the first user.

17. The method of claim 1, wherein the one or more topics associated with the identified second nodes and the one or more topics associated with the determined search intents are determined based on a set of subjects associated with an electronic topic index.

18. One or more computer-readable non-transitory storage media embodying software that is operable when executed to:
access a social graph comprising a plurality of nodes and a plurality of edges connecting the nodes, the nodes comprising:
a first node corresponding to a first user associated with an online social network; and
a plurality of second nodes corresponding to a plurality of objects associated with the online social network, respectively, each object being of a particular object-type, each second node being of a node-type corresponding to the object-type of the respective corresponding object;

receive from a client system of the first user a search query;
identify one or more second nodes that match the search query;
determine one or more search intents of the search query, the determined search intents being based on one or more topics associated with the identified second nodes and a ratio of one or more node-types of the identified second nodes that match the search query, wherein the determined search intent indicates a query type of the search query;
generate one or more search-result modules corresponding to the search query, the search-result modules being generated based on the one or more topics and one or more node-types associated with the determined search intents of the search query, each search-result module being associated with a particular object-type and comprising one or more search results, each search result comprising a reference to one of the identified second nodes having a node-type corresponding to the particular object-type of the respective search-result module; and
send, responsive to receiving the search query, a blended search-results page to the client system of the first user for display, the blended search-results page comprising a threshold number of the generated search-result modules, the search-result modules being presented in a blended order, the ordering of each search-result module being based on the determined search intents of the search query and a distribution of the one or more topics and one or more node-types of the determined search intents with respect to the particular object-type associated with the search-result module.

19. A system comprising: one or more processors; and a memory coupled to the processors comprising instructions executable by the processors, the processors operable when executing the instructions to:
access a social graph comprising a plurality of nodes and a plurality of edges connecting the nodes, the nodes comprising:
a first node corresponding to a first user associated with an online social network; and
a plurality of second nodes corresponding to a plurality of objects associated with the online social network, respectively, each object being of a particular object-type, each second node being of a node-type corresponding to the object-type of the respective corresponding object;
receive from a client system of the first user a search query;
identify one or more second nodes that match the search query;
determine one or more search intents of the search query, the determined search intents being based on one or more topics associated with the identified second nodes and a ratio of one or more node-types of the identified second nodes that match the search query, wherein the determined search intent indicates a query type of the search query;
generate one or more search-result modules corresponding to the search query, the search-result modules being generated based on the one or more topics and one or more node-types associated with the determined search intents of the search query, each search-result module being associated with a particular object-type and comprising one or more search results, each search result comprising a reference to one of the identified second nodes having a node-type corresponding to the particular object-type of the respective search-result module; and
send, responsive to receiving the search query, a blended search-results page to the client system of the first user for display, the blended search-results page comprising a threshold number of the generated search-result modules, the search-result modules being presented in a blended order, the ordering of each search-result module being based on the determined search intents of the search query and a distribution of the one or more topics and one or more node-types of the determined search intents with respect to the particular object-type associated with the search-result module.

* * * * *